US011270257B2

(12) United States Patent
Nakagawa et al.

(10) Patent No.: US 11,270,257 B2
(45) Date of Patent: Mar. 8, 2022

(54) COMMODITY MONITORING DEVICE, COMMODITY MONITORING SYSTEM, OUTPUT DESTINATION DEVICE, COMMODITY MONITORING METHOD, DISPLAY METHOD AND PROGRAM

(71) Applicant: NEC Corporation, Tokyo (JP)

(72) Inventors: Takayuki Nakagawa, Tokyo (JP); Yuma Shibuya, Tokyo (JP); Shigeaki Tokuda, Tokyo (JP); Junpei Yamasaki, Tokyo (JP); Satoshi Ohkubo, Tokyo (JP); Hiroshi Tezuka, Tokyo (JP); Nobuyuki Ikuta, Tokyo (JP); Kenichi Oohashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 39 days.

(21) Appl. No.: 16/490,398

(22) PCT Filed: Dec. 11, 2017

(86) PCT No.: PCT/JP2017/044360
§ 371 (c)(1),
(2) Date: Aug. 30, 2019

(87) PCT Pub. No.: WO2018/163547
PCT Pub. Date: Sep. 13, 2018

(65) Prior Publication Data
US 2020/0005231 A1    Jan. 2, 2020

(30) Foreign Application Priority Data

Mar. 6, 2017 (JP) .............................. JP2017-042079

(51) Int. Cl.
*G06Q 10/08* (2012.01)
*H04W 4/35* (2018.01)
(Continued)

(52) U.S. Cl.
CPC ......... *G06Q 10/087* (2013.01); *G06Q 20/203* (2013.01); *G06Q 20/208* (2013.01); *G08B 13/19613* (2013.01); *H04W 4/35* (2018.02)

(58) Field of Classification Search
CPC .. G06Q 10/087; G06Q 20/203; G06Q 20/208; G06Q 30/06; H04W 4/35; H04W 4/021; G08B 13/19613; H04N 7/18
See application file for complete search history.

(56) References Cited

U.S. PATENT DOCUMENTS 8,094,026 B1 * 1/2012 Green .............. G08B 13/19697
340/572.1
8,325,036 B1 * 12/2012 Fuhr ................ G08B 13/19613
340/540
(Continued)

FOREIGN PATENT DOCUMENTS

JP     2004-171240 A    6/2004
JP     2007-013629 A    1/2007
(Continued)

OTHER PUBLICATIONS

Mian Muhammad Kamal el at. International Journal of Recent Research Aspects ISSN: 2349-7688, vol. 3, Issue 3, Sep. 2016, pp. 55-60 (Year: 2016).*

(Continued)

*Primary Examiner* — Nathan A Mitchell

(57) ABSTRACT

A commodity monitoring device includes a commodity state detection unit configured to, on the basis of image information of a commodity group area set on a commodity shelf, detect removal of a commodity in a quantity satisfying a predetermined condition from the commodity group area; and a change detection information output unit configured to, if the commodity state detection unit has detected the removal, output to an output destination device change detection information including image time-series data of (Continued)

the commodity group area from a point in time at which the commodity state detection unit detected the removal to a predetermined past point in time.

20 Claims, 14 Drawing Sheets

(51) Int. Cl.
*G06Q 20/20* (2012.01)
*G08B 13/196* (2006.01)

(56) References Cited

U.S. PATENT DOCUMENTS

| | | | | |
|---|---|---|---|---|
| 9,158,975 | B2* | 10/2015 | Lipton | G06K 9/00771 |
| 9,892,438 | B1* | 2/2018 | Kundu | G06Q 30/0609 |
| 10,186,124 | B1* | 1/2019 | Mullins | G08B 13/19682 |
| 2005/0131578 | A1* | 6/2005 | Weaver | G06Q 10/087 |
| | | | | 700/244 |
| 2007/0057049 | A9* | 3/2007 | Kundu | G06Q 20/403 |
| | | | | 235/383 |
| 2007/0182818 | A1* | 8/2007 | Buehler | G08B 13/19641 |
| | | | | 348/143 |
| 2007/0279214 | A1* | 12/2007 | Buehler | G08B 13/19645 |
| | | | | 340/521 |
| 2008/0018738 | A1* | 1/2008 | Lipton | G08B 13/1968 |
| | | | | 348/143 |
| 2011/0094975 | A1* | 4/2011 | Hardy | A47F 5/0068 |
| | | | | 211/4 |
| 2013/0142494 | A1* | 6/2013 | Valiulis | G08B 13/1672 |
| | | | | 386/225 |
| 2013/0266181 | A1* | 10/2013 | Brewer | G06K 9/00302 |
| | | | | 382/103 |
| 2015/0127496 | A1* | 5/2015 | Marathe | G06Q 10/087 |
| | | | | 705/28 |
| 2016/0086460 | A1* | 3/2016 | King | G08B 13/1436 |
| | | | | 340/572.1 |
| 2016/0132823 | A1* | 5/2016 | Swafford | A47F 1/126 |
| | | | | 705/28 |
| 2016/0210829 | A1* | 7/2016 | Uchida | G06T 7/20 |
| 2017/0256148 | A1* | 9/2017 | King | G08B 13/1436 |
| 2017/0256149 | A1* | 9/2017 | Carey | G08B 31/00 |
| 2017/0295953 | A1* | 10/2017 | Sakata | G06K 9/00771 |
| 2018/0233012 | A1* | 8/2018 | Dey | G08B 21/0227 |
| 2018/0276480 | A1* | 9/2018 | Peterson | G06K 9/00771 |
| 2019/0080277 | A1* | 3/2019 | Trivelpiece | G06K 9/00771 |
| 2019/0205643 | A1* | 7/2019 | Liu | G06K 9/00624 |
| 2019/0311346 | A1* | 10/2019 | Costello | G06Q 20/18 |
| 2020/0327315 | A1* | 10/2020 | Mullins | G06K 9/00778 |

FOREIGN PATENT DOCUMENTS

| | | |
|---|---|---|
| JP | 2009-009231 A | 1/2009 |
| JP | 2009-088648 A | 4/2009 |
| JP | 2009-284167 A | 12/2009 |
| JP | 2010-277264 A | 12/2010 |
| JP | 2011-215941 A | 10/2011 |
| JP | 2012-174154 A | 9/2012 |
| JP | 2013-256167 A | 12/2013 |

OTHER PUBLICATIONS

Yamato et al. Security camera movie and ERP data matching system to prevent theft. Conference: 2017 14th IEEE Annual Consumer Communications & Networking Conference (CCNC). Jan. 2017 (Year: 2017).*

A. W. Senior et al., "Video analytics for retail," 2007 IEEE Conference on Advanced Video and Signal Based Surveillance, London, 2007, pp. 423-428, doi: 10.1109/AVSS.2007.4425348 (Year: 2007).*

NEC Corporation, Event Guide, C&C User Forum & iEXP02016, Nov. 1-2, 2016 (5 pages).

International Search Report corresponding to PCT/JP2017/044360 dated Mar. 6, 2018 (4 pages).

* cited by examiner

COMMODITY MONITORING DEVICE, COMMODITY MONITORING SYSTEM, OUTPUT DESTINATION DEVICE, COMMODITY MONITORING METHOD, DISPLAY METHOD AND PROGRAM

CROSS REFERENCE-TO RELATED APPLICATIONS

This application is a national stage application of International Application No. PCT/JP2017/044360 entitled "Commodity Monitoring Device, Commodity Monitoring System, Output Destination Device, Commodity Monitoring Method, Display Method and Program" filed on Dec. 11, 2017, which claims priority to Japanese Patent Application No. 2017-042079 filed on Mar. 6, 2017, the disclosures of which are hereby incorporated by reference in their entirety.

TECHNICAL FIELD

The present invention relates to a commodity monitoring device, a commodity monitoring system, an output destination device, a commodity monitoring method, a display method and a program.

BACKGROUND ART

Several techniques have been proposed in connection with the management of commodities placed on commodity shelves.

For example, in the stock state management method disclosed in Patent Document 1, when an image of a display shelf for commodities (commodity shelf) is monitored and an out-of-commodity marker provided on the display shelf is detected, the commodity associated with the out-of-commodity marker is identified. Then, a process is performed to superimpose a message indicating that a stock check is underway at a position in the image of the display shelf where the out-of-commodity marker is detected.

CITATION LIST

Patent Literature

[Patent Document 1] Japanese Unexamined Patent Application, First Publication No. 2012-174154

SUMMARY OF INVENTION

Problems to be Solved by the Invention

In a store that sells commodities, it is preferable to be able to detect, at a cost as low as possible, an event in which a commodity is expected to be brought out of the store improperly. In this respect, Patent Document 1 does not disclose a method for detecting an event in which a commodity is expected to be brought out of the store improperly.

An object of the present invention is to provide a commodity monitoring device, a commodity monitoring system, an output destination device, a commodity monitoring method, a display method and a program that can solve the above-mentioned problem.

Means for Solving the Problems

According to an exemplary first aspect of the present invention, a commodity monitoring device includes with a commodity state detection unit configured to, on the basis of image information of a commodity group area set on a commodity shelf, detect removal of a commodity in a quantity satisfying a predetermined condition from the commodity group area, and a change detection information output unit configured to, if the commodity state detection unit has detected the removal, output to an output destination device change detection information including image time-series data of the commodity group area from a point in time at which the commodity state detection unit detected the removal to a predetermined past point in time.

According to an exemplary second aspect of the present invention, a commodity monitoring system is provided with a commodity monitoring device and an output destination device, the commodity monitoring device including a commodity state detection unit configured to, on the basis of image information of a commodity group area set on a commodity shelf, detect removal of a commodity in a quantity satisfying a predetermined condition from the commodity group area; and a change detection information output unit configured to, if the commodity state detection unit has detected the removal, output to the output destination device change detection information including image time-series data of the commodity group area from a point in time at which the commodity state detection unit detected the removal to a predetermined past point in time.

According to an exemplary third aspect of the present invention, an output destination device includes a change detection information acquisition unit configured to, when removal of a commodity in a quantity satisfying a predetermined condition from a commodity group area set on a commodity shelf is detected, acquire change detection information including image time-series data of the commodity group area from a point in time at which the removal was detected to a predetermined past point in time; and a display unit configured to display the image of the commodity group area included in the change detection information.

According to an exemplary fourth aspect of the present invention, a commodity monitoring method includes the step of: when, based on image information of a commodity group area set on a commodity shelf, removal of a commodity in a quantity satisfying a predetermined condition from the commodity group area is detected, outputting to an output destination device change detection information including image time-series data of the commodity group area from a point in time at which the removal was detected to a predetermined past point in time.

According to an exemplary fifth aspect of the present invention, a display method includes the steps of: when removal of a commodity in a quantity satisfying a predetermined condition from a commodity group area set on a commodity shelf is detected, acquiring change detection information including image time-series data of the commodity group area from a point in time at which the removal was detected to a predetermined past point in time; and displaying the image of the commodity group area included in the change detection information.

According to an exemplary sixth aspect of the present invention, a program causes a computer to execute a process including the step of: when, based on image information of a commodity group area set on a commodity shelf, removal of a commodity in a quantity satisfying a predetermined condition from the commodity group area is detected, outputting to an output destination device change detection information including image time-series data of the commodity group area from a point in time at which the removal was detected to a predetermined past point in time.

According to an exemplary seventh aspect of the present invention, a program causes a computer to execute a process including the steps of: when removal of a commodity in a quantity satisfying a predetermined condition from a commodity group area set on a commodity shelf is detected, acquiring change detection information including image time-series data of the commodity group area from a point in time at which the removal was detected to a predetermined past point in time; and displaying the image of the commodity group area included in the change detection information.

Advantageous Effects of Invention

According to the present invention, it is possible to detect at a comparatively low cost an event in which a commodity is expected to be brought out of a store improperly.

DESCRIPTION OF EMBODIMENTS

The best mode for carrying out the present invention will herinbelow be described in detail. The following embodiments are not intended to limit the scope of the claims of the present invention. At the same time, not all combinations of features described in the embodiments are essential to the solving means of the present invention.

Figure 1:
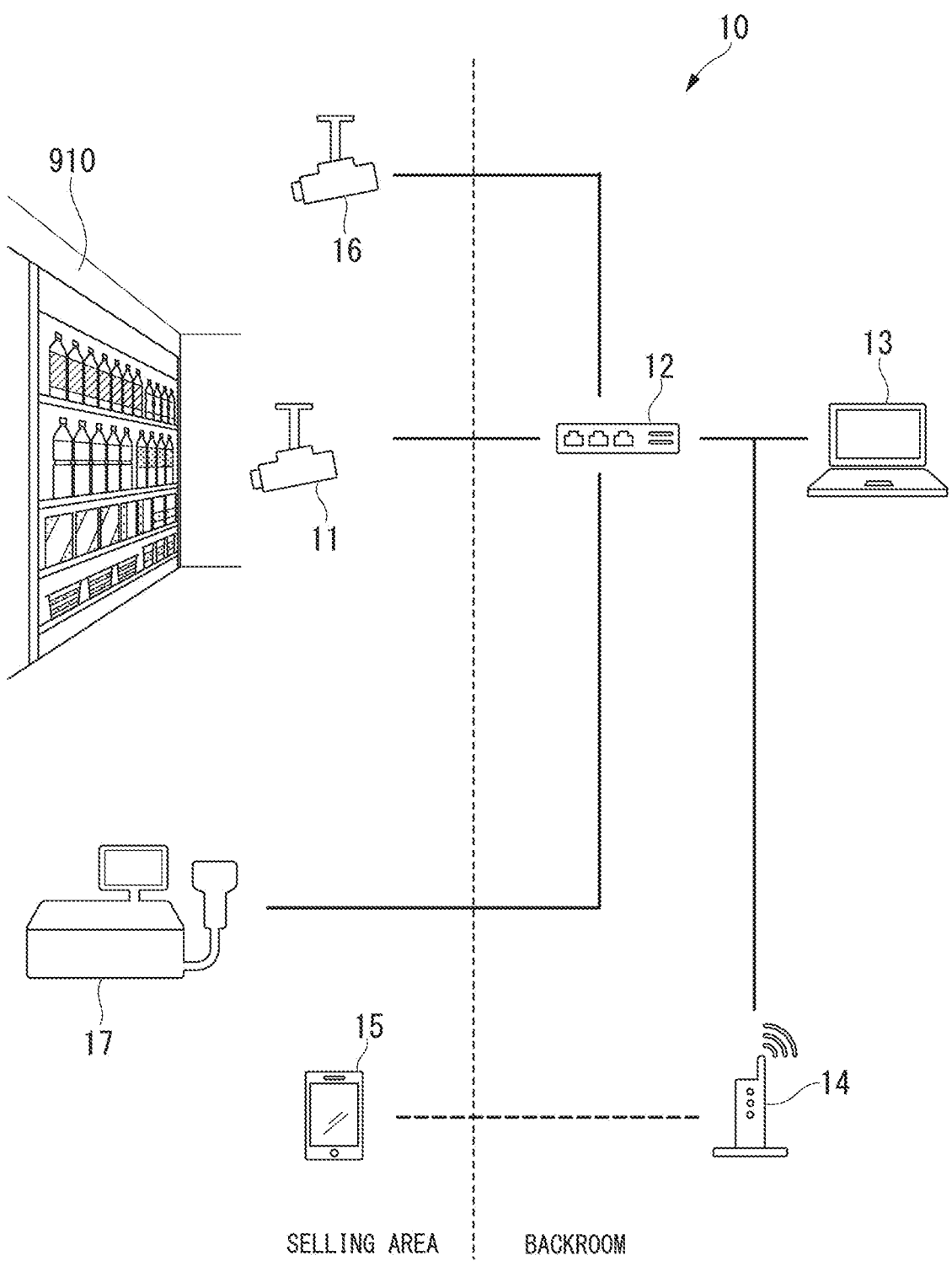
FIG. 1 is a schematic block diagram showing a device configuration example of the commodity monitoring system according to one embodiment.

FIG. 1 is a schematic block diagram showing a device configuration example of the commodity monitoring system according to the embodiment. In the example of FIG. 1, the commodity monitoring system 10 is provided with a shelf monitoring camera 11, a hub 12, a commodity monitoring device 13, a wireless router device 14, a terminal device 15, an in-store monitoring camera 16, and a POS (Point Of Sales) system 17.

Further, FIG. 1 shows a commodity shelf 910 on which the commodity to be monitored by the commodity monitoring system 10 is displayed. The number of commodity shelves 910 targeted by the commodity monitoring system 10 may be one or more.

Further, in the example of FIG. 1, the shelf monitoring camera 11, the terminal device 15, the in-store monitoring camera 16, the POS system 17, and the commodity shelf 910 are disposed in the selling area. The hub 12, the commodity monitoring device 13, and the wireless router device 14 are disposed in a backroom. The backroom is basically a room in which customers are not allowed to enter.

The commodity monitoring system 10 monitors a commodity displayed on the commodity shelf 910. In particular, the commodity monitoring system 10 detects that a commodity in a quantity satisfying a predetermined condition has been collectively removed from the commodity shelf 910.

In the case of a large number of commodities being removed from the commodity shelf at one time, the loss if stolen will be greater than if one commodity is stolen. In addition, cases have been observed in which when many commodities have been stolen at one store in a single instance, a similar theft will occur at the same store or another store of the same chain.

Therefore, when the commodity monitoring system 10 detects that a commodity has been removed, a clerk confirms the situation in the vicinity of the commodity shelf 910, calls out to a customer, work near the customer, and informs a security guard as needed. Thereby it is possible to prevent a theft from occurring. Further, when it is later found out that commodities whose removal was detected by the commodity monitoring system 10 have been stolen, the theft is brought to the attention of the employees or chain store. This may prevent a recurrence of theft.

The shelf monitoring camera 11 images the commodity shelf 910 and transmits an image of the commodity shelf 910 to the commodity monitoring device 13.

The in-store monitoring camera 16 is provided, for example, on the ceiling of the store and images the inside of the store. In particular, the in-store monitoring camera 16 images an aisle in the store. The in-store monitoring camera 16 transmits the in-store image that has been captured to the commodity monitoring device 13. The image captured by the in-store monitoring camera 16 is used by the commodity monitoring device 13 to detect the customer traffic line.

The POS system 17 is used for accepting payments when a customer purchases a commodity or service, and also stores sales information. The POS system 17 transmits sales information to the commodity monitoring device 13 in response to a request from the commodity monitoring device 13. The POS system 17 corresponds to an example of a sales information management device.

The commodity monitoring device 13 monitors commodities on the commodity shelf 910 on the basis of the image captured by the shelf monitoring camera 11. In particular, the commodity monitoring device 13 detects that commodities in quantities satisfying a predetermined condition have been collectively removed from the commodity shelf 910.

The commodity monitoring device 13 functions as a server device for the terminal device 15. In particular, the commodity monitoring device 13 transmits change detection information to the terminal device 15 when it is detected that a commodities in quantities satisfying the predetermined condition have been collectively removed from the commodity shelf 910. The change detection information mentioned here is information for notifying that commodities in quantities satisfying a predetermined condition have been collectively removed from the commodity shelf 910. The change detection information includes image data of an image of the commodity shelf 910 at a point in time heading backward into the past from the point in time at which the commodities in quantities satisfying the predetermined condition were collectively removed from the commodity shelf 910.

The commodity monitoring device 13 is configured using, for example, a computer such as a notebook personal computer (PC) or a workstation.

Figure 2:
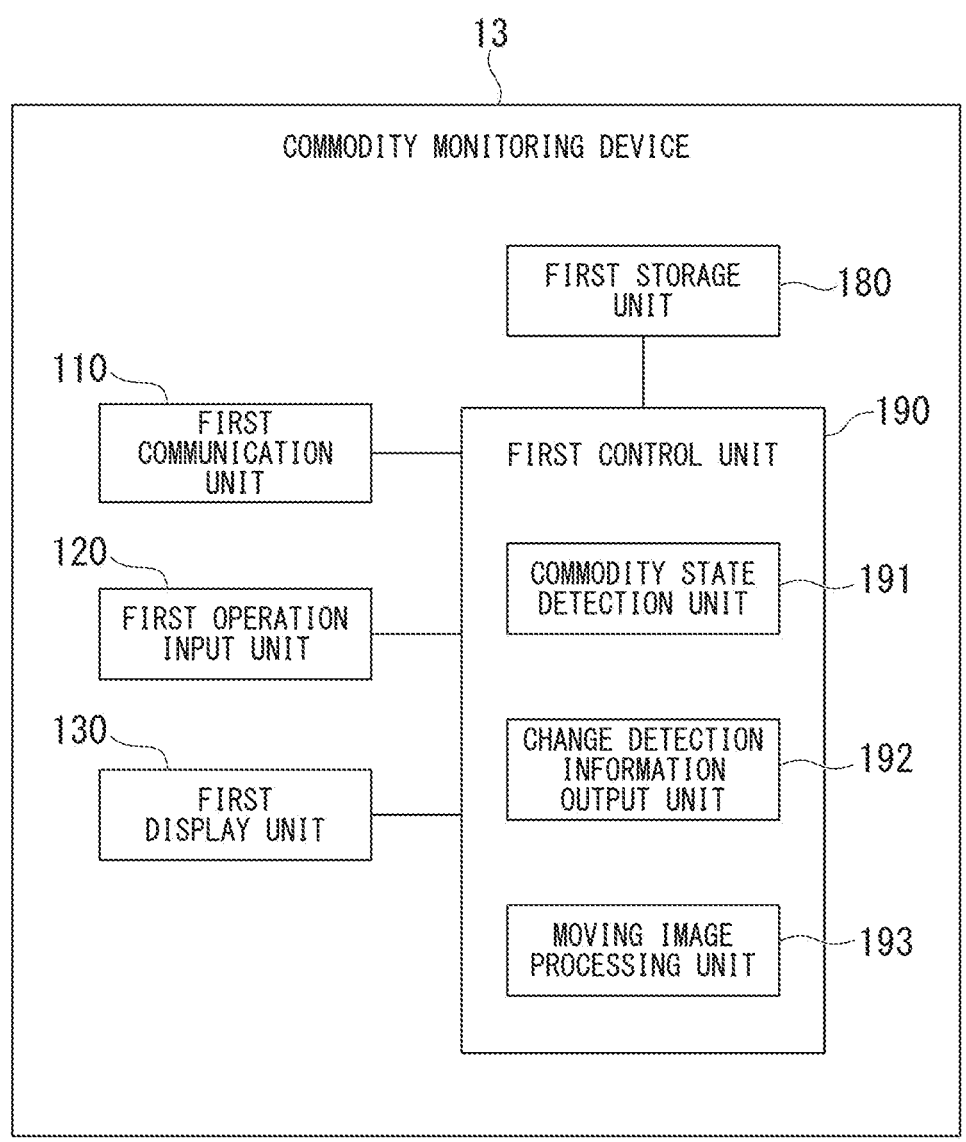
FIG. 2 is a schematic block diagram showing an example of the function configuration of the commodity monitoring device according to the same embodiment.

FIG. 2 is a schematic block diagram showing an example of the function configuration of the commodity monitoring device 13. In the example of FIG. 2, the commodity monitoring device 13 is provided with a first communication unit 110, a first operation input unit 120, a first display unit 130, a first storage unit 180, and a first control unit 190. The first control unit 190 is provided with a commodity state detection unit 191, a change detection information output unit 192, and a moving image processing unit 193.

The first communication unit 110 communicates with other devices. In particular, the first communication unit 110 receives image data captured by the shelf monitoring camera 11 and the in-store monitoring camera 16. In addition, the first communication unit 110 transmits a request for sales information to the POS system 17 and receives the sales information transmitted by the POS system 17. The first communication unit 110 also transmits change detection information to the terminal device 15.

The first operation input unit 120 is provided with input devices such as a keyboard and a mouse, for example, and receives user operations.

The first display unit 130 is provided with, for example, a front screen such as a liquid crystal panel, and displays various images according to the control of the first control unit 190.

The first storage unit 180 stores various forms of data. The first storage unit 180 is configured using a storage device provided in the commodity monitoring device 13.

The first control unit 190 controls each portion of the commodity monitoring device 13 to perform various processes. The first control unit 190 is constituted by a CPU (central processing unit) included in the commodity monitoring device 13 reading and executing a program from the first storage unit 180.

The commodity state detection unit 191 detects a removal of a commodity in a quantity satisfying a predetermined condition from the commodity group area on the basis of image information of the commodity group area set on the commodity shelf 910. Specifically, the commodity state detection unit 191 compares an image of the commodity shelf 910 captured by the shelf monitoring camera 11 with a past image for each commodity group area. When, in the image area of a commodity group area, a proportion of a partial area in which a difference with the past image has been detected is equal to or greater than a predetermined threshold value, the commodity state detection unit 191 determines that commodities in quantities satisfying the predetermined condition have been removed from the commodity group area.

In order to reduce the possibility of false detection due to a temporary image change when a customer passes in front of the shelf, a past image that extends back a somewhat long time, such as an image of 3 seconds ago, may be used as the past image used for comparison.

A description will be given using as an example the case where a quantity satisfying a predetermined condition used in the determination criterion of the commodity state detection unit 191 indicates a proportion of the area. The predetermined condition is one in which, for example, the image area of removed commodities in the image captured by the shelf monitoring camera 11 accounts for a predetermined proportion or greater of the image area of the commodity group area including the image of the commodities.

However, the quantity satisfying the predetermined condition used as the determination criterion by the commodity state detection unit 191 is not limited to this example. For example, the quantity satisfying the predetermined condition may indicate commodities of a predetermined number or more. In this case, for example, the commodity state detection unit 191 may calculate the number of commodities that have been removed on the basis of the image information in the commodity group area, and determine whether the number of commodities that were removed is equal to or greater than the predetermined number.

The predetermined threshold value here is set to, for example, 50%. However, the predetermined threshold value is not limited to 50%. Also, different threshold values may be set for each commodity group area. For example, the user may set a relatively small threshold value for an area of expensive commodities. As a result, for expensive commodities, the commodity state detection unit 191 detects the case of a relatively small number of commodities being removed.

Figure 3:
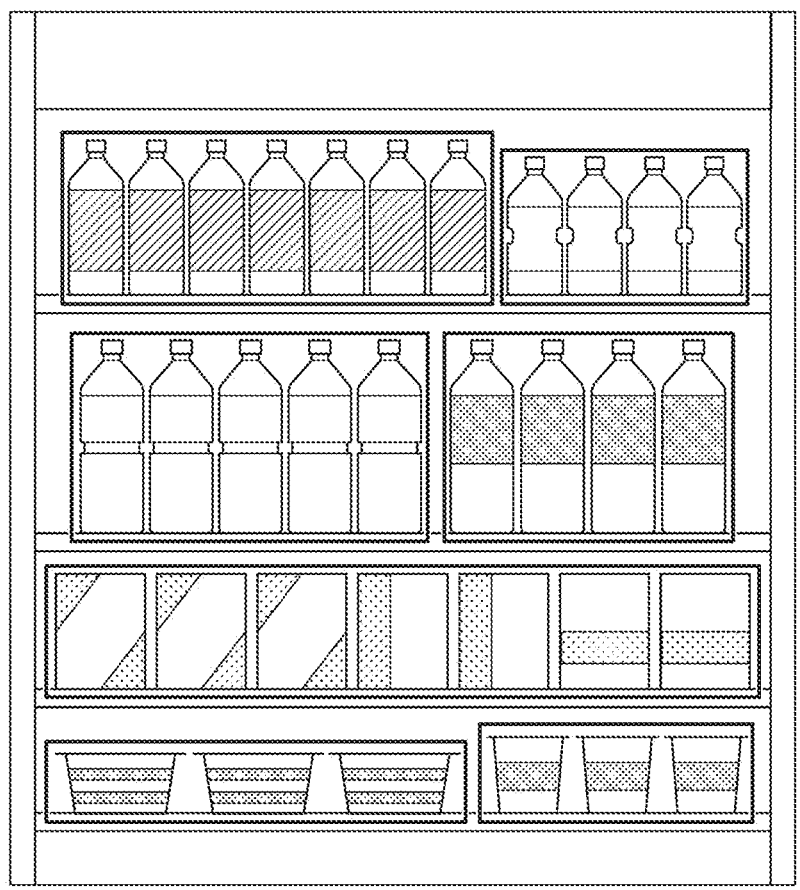
FIG. 3 is a drawing showing an example of setting of commodity group areas according to the same embodiment.

FIG. 3 is a drawing showing an example of setting commodity group areas. The solid line rectangles shown in FIG. 3 indicate commodity group areas. As shown in FIG. 3, in the image of the commodity shelf 910, one or more commodity group areas are preset according to the arrangement of commodities. As described above, the commodity state detection unit 191 determines, for each commodity group area shown in FIG. 3, whether or not a commodity in a quantity satisfying a predetermined condition has been removed.

The setting criteria of a commodity group area is not limited to a specific criteria. For example, a commodity group area may be set for each arrangement area of the same commodity, or a commodity group area may be set for each arrangement area of commodities of the same maker. Alternatively, the commodity group area may be set for each arrangement area of commodities of the same type such as magazines. Alternatively, the commodity group area may be set for each row of the commodity shelf 910. Further, the commodity group area may be set by a combination of a plurality of criteria.

From the viewpoint of enhancing the detection accuracy of the commodity state detection unit 191, it is preferable that the sizes of the commodities arranged in the same commodity group area be approximately the same size.

In the following, removal of a commodity in a quantity satisfying a predetermined condition from the commodity group area is also referred to simply as removal.

When the commodity state detection unit 191 has detected removal, the change detection information output unit 192 outputs to the terminal device 15 change detection information that includes image time-series data of the commodity group area from the time when the commodity state detection unit 191 detects removal until a predetermined point in time in the past.

Specifically, the first storage unit 180 stores images of an immediate predetermined time duration among the images of the commodity shelf 910 captured by the shelf monitoring camera 11. When the commodity state detection unit 191 has detected removal, for example, image data of each predetermined period such as every one second, among image data of a predetermined period of time such as 10 seconds preceding for example the time of removal detection, are read out from the first storage unit 180. Then, the change detection information output unit 192 generates change detection information including the image data that has been read out. The change detection information output unit 192 transmits the generated change detection information to the terminal device 15 via the first communication unit 110.

Further, the change detection information output unit 192 acquires, from the POS system 17 via the first communication unit 110, sales information indicating the sales history of the commodity after the point in time at which the commodity state detection unit 191 has detected the removal. Then, the change detection information output unit 192 outputs the change detection information including the acquired sales information to the terminal device 15 via the first communication unit 110. By referring to the sales information, the store clerk who refers to the terminal device 15 can determine whether or not the removal is a legitimate removal for the purpose of purchase. That is, the clerk determines, on the basis of the sales information, whether or not purchase of the commodities has been performed after the removal of the commodities has been detected.

The change detection information output unit 192 may output the acquired sales information to the terminal device 15 after outputting the change detection information to the terminal device 15. Specifically, the change detection information output unit 192 acquires, from the POS system 17, sales information showing the sales history of the removed commodities after the point in time at which the commodity state detection unit 191 has detected the removal, and outputs the acquired sales information to the terminal device 15. In this way, the change detection information output unit 192 outputs change detection information to the terminal device 15 without waiting for the acquisition of the sales information. Thereby, the store clerk possessing the terminal device 15 (the user of the terminal device 15) can quickly recognize and respond to removal of commodities from the commodity shelf 910.

The change detection information output unit 192 may also acquire the sales information registered in the POS system 17 within a predetermined time from when the commodity state detection unit 191 has detected removal. The predetermined time in this case is also referred to as a first time.

As described above, by limiting the time range in which the change detection information output unit 192 acquires the sales information, it is possible to limit the sales information to which the clerk possessing the terminal device 15 refers. In this respect, the burden on the store clerk can be reduced.

When it is not possible to acquire sales information of the removed commodities from the POS system 17 within a predetermined time from the point in time when the commodity state detection unit 191 has detected removal, the change detection information output unit 192 may output change detection information that does not include sales information to the terminal device 15. The predetermined time in this case is also referred to as a second time.

If the sales information is not included in the change detection information, the store clerk who possesses the terminal device 15 can assume there is a high possibility that the commodities have been removed of the store without being processed by the POS system 17. That is, the clerk can surmise that there is a high possibility that the commodities have been stolen.

The first time and the second time may be the same time or may be different times. For example, the second time may be set to a time longer than the first time. When the first time becomes long, it is conceivable that the number of items of sales information referred to by the clerk possessing the terminal device 15 increases and so the burden on the clerk also increases. On the other hand, even if the second time lengthens, the burden on the store clerk does not increase. Therefore, the second time may be set to a relatively long time. As a result, the determination as to whether or not commodities have been removed from the store without being processed by the POS system 17 can be made more accurately.

The change detection information output unit 192 may acquire information relating to the person who has performed the removal on the basis of a past image of the commodity group area referenced to the point in time when the commodity state detection unit 191 detected the removal. Then, the change detection information output unit 192 may output change detection information including information relating to the person who has performed the removal to the terminal device 15.

It is highly likely that a person appearing in a past image close to the point in time when the commodity state detection unit 191 detects removal is the person who has performed the removal. Therefore, the change detection information output unit 192 may detect a person appearing in the image of the shelf monitoring camera 11 heading backward into the past from the point in time when the commodity state detection unit 191 has detected removal. For example, the change detection information output unit 192 performs person detection until succeeding in person detection, heading backward into the past in sequence from an image at the time the commodity state detection unit 191 detected removal. Alternatively, for images within a predetermined time in the past (for example, 3 seconds) from the point in time at which removal was detected by the commodity state detection unit 191, the change detection information output unit 192 may detect all persons appearing in the images.

When the change detection information output unit 192 has succeeded in detecting a person, the change detection information output unit 192 detects information relating to that person as information relating to the person who has performed the removal (the person who may have performed the removal).

The change detection information output unit 192 determines, for example, the color of clothing of the person, includes information on the determined color of clothing in the change detection information, and outputs the change detection information to the terminal device 15. Information relating to the person who performed removal is not limited to information on the color of the person's clothing, and can be various types of information. For example, as information on the person who performed removal, the change detection information output unit 192 may include separate information relating to this person in the change detection information in addition to information on the color of the person's clothing, or instead of information on the color of the clothing of the person. Other information related to the person may be, for example, a facial image of the person, flow line information indicating the movement of the person, information indicating whether the person processed commodities by the POS system 17, attribute information of the person or a combination of the above. Attribute information of a person is either one or both of gender and height.

In this way, when the clerk in possession of the terminal device 15 is specifying the person who has performed the removal, the clerk refers to information on the person who has performed the removal. This can increase the accuracy of person identification.

Alternatively, the change detection information output unit 192, after outputting the change detection information to the terminal device 15, may output the information regarding the person who has performed removal to the terminal device 15.

As described above, the change detection information output unit 192 outputs the change detection information to the terminal device 15 without waiting for acquisition of information on the person who has performed the removal. Thereby, the clerk in possession of the terminal device 15 can quickly recognize and respond to removal of commodities from the commodity shelf 910.

The change detection information output unit 192, based on information on a person who has performed removal, may determine whether the person has passed the commodities through a predetermined checkout area. Specifically, the change detection information output unit 192 may determine whether this person has settled payment at the POS system 17 or not. Upon determining that the person has not passed commodities through the checkout area, the change detection information output unit 192, after outputting the change detection information to the terminal device 15, may output information on the person who has performed the removal to the terminal device 15.

As described above, the change detection information output unit 192 outputs information relating to the person who has performed the removal to the terminal device 15 only when the person who has performed the removal is determined to have not passed the commodities through the predetermined checkout area. As a result, the change detection information output unit 192 can reduce the number of times the store clerk possessing the terminal device 15 refers to information relating to the person. If the person who performed the removal does not pass the commodities through the predetermined checkout area, there is a high possibility that the commodities were stolen. Accordingly, the clerk need only refer to the information relating to the person who removed the commodities when the commodities are likely to have been stolen. Therefore, the burden on the store clerk can be reduced.

When the commodity state detection unit 191 detects removal, the moving image processing unit 193 displays in the first display unit 130 a moving image of the commodity shelf 910 of a past predetermined time from a point in time at which the commodity state detection unit 191 detected removal. In this case, the commodity monitoring device 13 provided with the first display unit 130 corresponds to an example of a display device.

For example, the shelf monitoring camera 11 captures a moving image of the commodity shelf 910 and transmits moving image data to the commodity monitoring device 13. In the commodity monitoring device 13, the moving image processing unit 193 causes the first storage unit 180 to temporarily store an immediate predetermined time duration from the past moving image data captured by the shelf monitoring camera 11. When the commodity state detection unit 191 detects removal, the moving image processing unit 193 saves in the first storage unit 180 moving image data of a past predetermined time duration from the point in time at which the commodity state detection unit 191 has detected removal, from the moving image data temporarily stored in the first storage unit 180. The first storage unit 180 stores, without deleting, the moving image data that the moving image processing unit 193 has instructed to be saved. The moving image processing unit 193 plays back moving image data according to the user operations and causes the first display unit 130 to display the data.

The commodity monitoring device 13 displays a moving image of the commodity shelf 910, and the terminal device 15 displays a frame-by-frame advancing image (a still image for every predetermined time) of the commodity shelf 910. Thus, images can be used appropriately depending on the communication band and the processing capability of the device.

However, the terminal device 15 may display a moving image of the commodity shelf 910.

The terminal device 15, upon receiving the change detection information from the commodity monitoring device 13, outputs a removal alarm (alarm). Here, the removal alarm is an alarm that indicates that a removal has occurred. The terminal device 15 corresponds to an example of an output destination device.

The terminal device 15 also generates and updates loss information according to user operation. The loss information referred to here is information indicating whether or not the removal is an unauthorized removal, and the status of the removal.

The terminal device 15 is configured to use, for example, a portable terminal device such as a tablet terminal device or a smartphone. Alternatively, the terminal device 15 may be configured as a fixed terminal device. For example, the terminal device 15 is installed in a fixed manner near the POS system 17.

For example, a clerk in the sales department holds the terminal device 15. When the terminal device 15 outputs a removal alarm, the clerk confirms the condition of the commodity shelf 910. As described above, the clerk confirms the situation in the vicinity of the commodity shelf 910, calls out to the customer, work near the customer, and informs a security guard as needed. Thereby it is possible to prevent a theft from occurring.

The clerk inputs loss information to the terminal device 15 on the basis of the confirmation result of the state of the commodity shelf 910.

Figure 4:
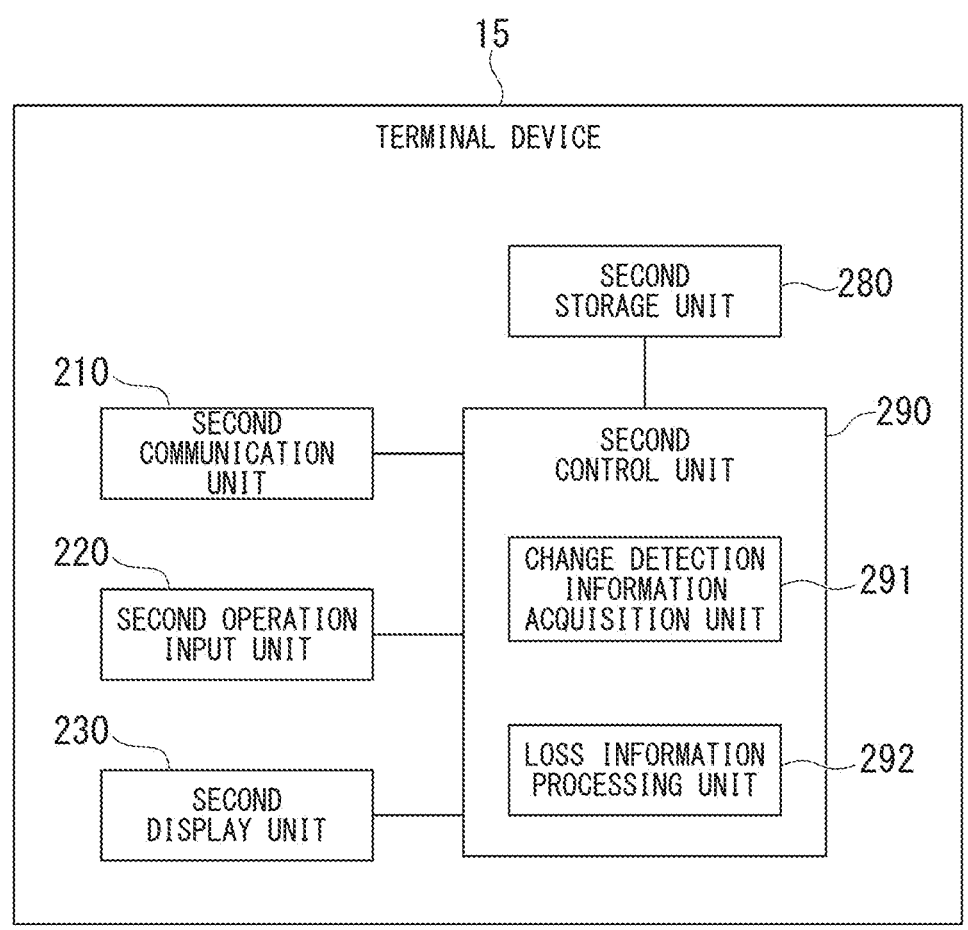
FIG. 4 is a schematic block diagram showing an example of a functional configuration of the terminal device according to the same embodiment.

FIG. 4 is a schematic block diagram showing an example of a functional configuration of the terminal device 15. In the example of FIG. 4, the terminal device 15 is provided with a second communication unit 210, a second operation input unit 220, a second display unit 230, a second storage unit 280, and a second control unit 290. The second control unit 290 is provided with a change detection information acquisition unit 291 and a loss information processing unit 292.

The second communication unit 210 communicates with other devices. In particular, the second communication unit 210 receives change detection information from the commodity monitoring device 13. Further, the second communication unit 210 transmits the loss information to the commodity monitoring device 13.

The second display unit 230 is provided with, for example, a display screen such as a liquid crystal panel and displays various images according to the control of the second control unit 290. In particular, the second display unit 230 displays any image of the image time-series data included in the change detection information on the basis of the user operation according to the control of the second control unit 290. Specifically, the change detection information includes an image for each predetermined time among the images of the commodity shelf 910 captured by the shelf monitoring camera 11. The second display unit 230 displays the image designated by the user operation among the images of the commodity shelf 910 included in the change detection information according to the control of the second control unit 290.

The second operation input unit 220 is provided with, for example, a touch sensor provided on the display screen of the second display unit 230 to configure a touch panel, and receives user operations.

The second storage unit 280 stores various forms of data. The second storage unit 280 is configured to use a storage device provided in the terminal device 15.

The second control unit 290 controls each portion of the terminal device 15 to perform various processes. The second control unit 290 is constituted by a CPU included in the terminal device 15 reading and executing a program from the second storage unit 280.

The change detection information acquisition unit 291 acquires change detection information from the commodity monitoring device 13. Specifically, when the commodity monitoring device 13 detects removal and transmits change detection information, the second communication unit 210 receives communication data from the commodity monitoring device 13. The change detection information acquisition unit 291 extracts change detection information from the communication data received by the second communication unit 210.

The change detection information acquisition unit 291 causes the second display unit 230 to display the removal alarm on the basis of the change detection information. The terminal device 15 may output the removal alarm with either one or both of audio and vibration in addition to or instead of displaying the removal alarm on the second display unit 230.

The loss information processing unit 292 generates and updates the loss information in accordance with a user operation. Specifically, the loss information processing unit 292 causes the second display unit 230 to display a details registration screen for editing the loss information, on the occasion (trigger) of receiving the change detection information or a user operation. Then, when the store clerk, who is the user of the terminal device 15, performs a user operation of inputting the loss information according to the details registration screen, the loss information processing unit 292 generates or updates the loss information according to the user operation.

Returning to FIG. 1, the hub 12 mediates communication between devices connected to the hub 12. In particular, the hub 12 establishes a communication path between the shelf monitoring camera 11 and the commodity monitoring device 13, between the in-store monitoring camera 16 and the commodity monitoring device 13, between the POS system 17 and the commodity monitoring device 13, and between the wireless router device 14 and the commodity monitoring device 13.

The wireless router device 14 wirelessly communicates with the terminal device 15 to mediate communication between the terminal device 15 and each device. In particular, the combination of the hub 12 and the wireless router device 14 establishes a communication path between the commodity monitoring device 13 and the terminal device 15.

However, the configuration of the commodity monitoring system 10 is not limited to the configuration shown in FIG. 1.

For example, the terminal device 15 may also be provided with the function of the commodity monitoring device 13. In this case, the commodity monitoring system 10 need not be provided with the commodity monitoring device 13.

Further, the in-store monitoring camera 16 and the POS system 17 are not essential to the commodity monitoring system 10. The commodity monitoring system 10 need not be provided with one or both of the in-store monitoring camera 16 and the POS system 17.

Further, the commodity monitoring device 13 may directly communicate with another device. In this case, the commodity monitoring system 10 need not be provided with one or both of the hub 12 and the wireless router device 14.

Next, screen display by the second display unit 230 (FIG. 4) of the terminal device 15 will be described with reference to FIGS. 5 to 11.

Figure 5:
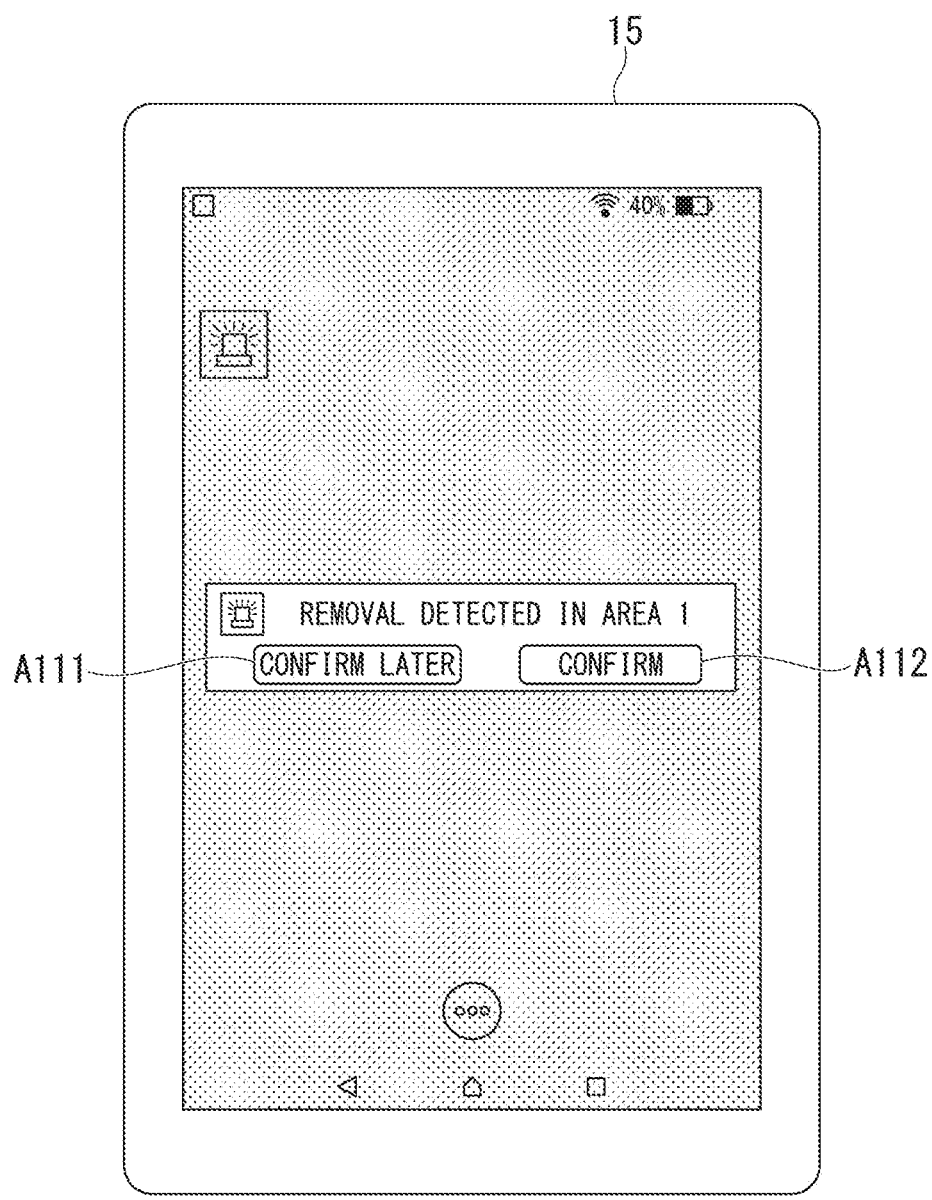
FIG. 5 is a drawing showing an example of a notification screen displayed by the second display unit according to the same embodiment.

FIG. 5 is a drawing showing an example of a notification screen displayed by the second display unit 230. The display of the notification screen by the second display unit 230 corresponds to an example of the output of the removal alarm.

In the example of FIG. 5, the second display unit 230 displays the commodity group area in which removal is detected, and also displays a message indicating that a removal has been detected. Furthermore, the second display unit 230 displays a button icon in each of areas A111 and A112.

When a touch operation on the area A111 is performed, the second display unit 230 ends the display of the removal alarm according to the control of the second control unit 290, and displays the standby screen (desktop screen).

When a touch operation on the area A112 is performed, the second display unit 230 displays the detection information screen according to the control of the second control unit 290. The detection information screen will be described with reference to FIG. 6.

Figure 6:
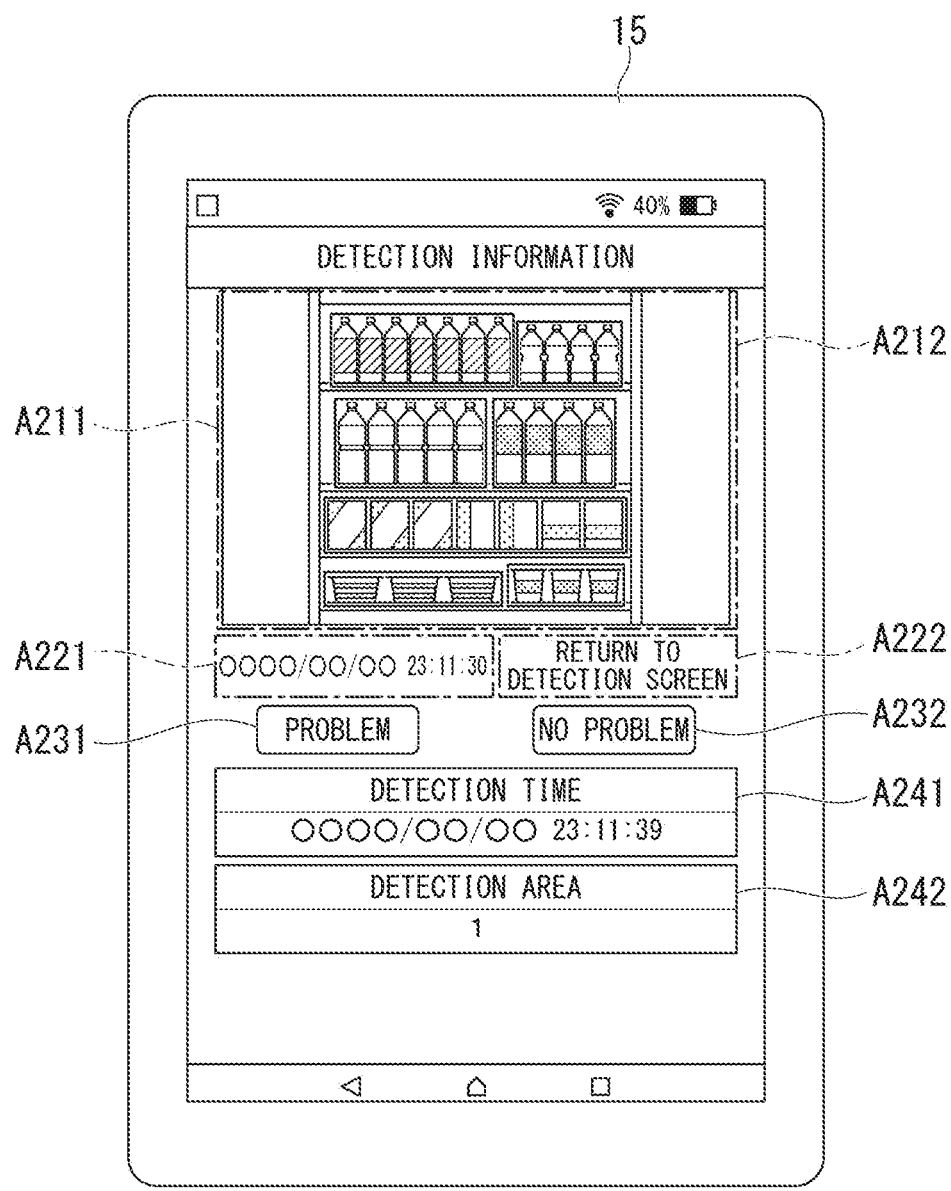
FIG. 6 is a drawing showing an example of a detection information screen displayed by the second display unit according to the same embodiment.

FIG. 6 is a drawing showing an example of a detection information screen displayed by the second display unit 230.

In the example of FIG. 6, the second display unit 230 displays an image of the commodity shelf 910 captured by the shelf monitoring camera 11 in area A211. An area A12 in the image of the commodity shelf 910 is an area in which the commodity state detection unit 191 has detected a change in the image. The second display unit 230 shows an area in the image of the commodity shelf 910 in which a change in the image has been detected.

The image displayed in the area A211 by the second display unit 230 is one of a plurality of time-series images from a point in time at which the commodity state detection unit 191 has detected the removal to a predetermined past point in time. The second display unit 230 switches the image according to the user operation. For example, when a flick operation to the right direction is performed in the area A211, the second display unit 230 displays an image at a later point in time according to the control of the second control unit 290. When a flick operation to the left direction is performed in the area A211, the second display unit 230 displays an image at an earlier time point according to the control of the second control unit 290.

The second display unit 230 shows in an area A221 capture time information of the image displayed in the area A211. When a touch operation to an area A222 is performed, the second display unit 230, in accordance with the second control unit 290, switches the image displayed in the area A211 to the image at the time when the commodity state detection unit 191 detected removal.

The second display unit 230 displays an icon of a push button in each of the display areas A231 and A232.

When a touch operation on the area A231 is performed, the second display unit 230 displays a details registration screen in accordance with the control of the second control unit 290. The details registration screen will be described later with reference to FIG. 7.

On the other hand, when a touch operation on the area A232 is performed, the second display unit 230 displays a standby screen. This means that the store clerk who is the user of the terminal device 15 has determined that the removal is a valid removal. Therefore, the terminal device 15 ends the screen display regarding the removal without requesting the user to input detailed information on the removal.

The second display unit 230 displays the time at which the commodity state detection unit 191 detected the removal in an area A241, and displays the name of the commodity group area in which the commodity state detection unit 191 detects the removal in an area A242. The name of the commodity group area is, for example, set in advance by the user.

Figure 7:
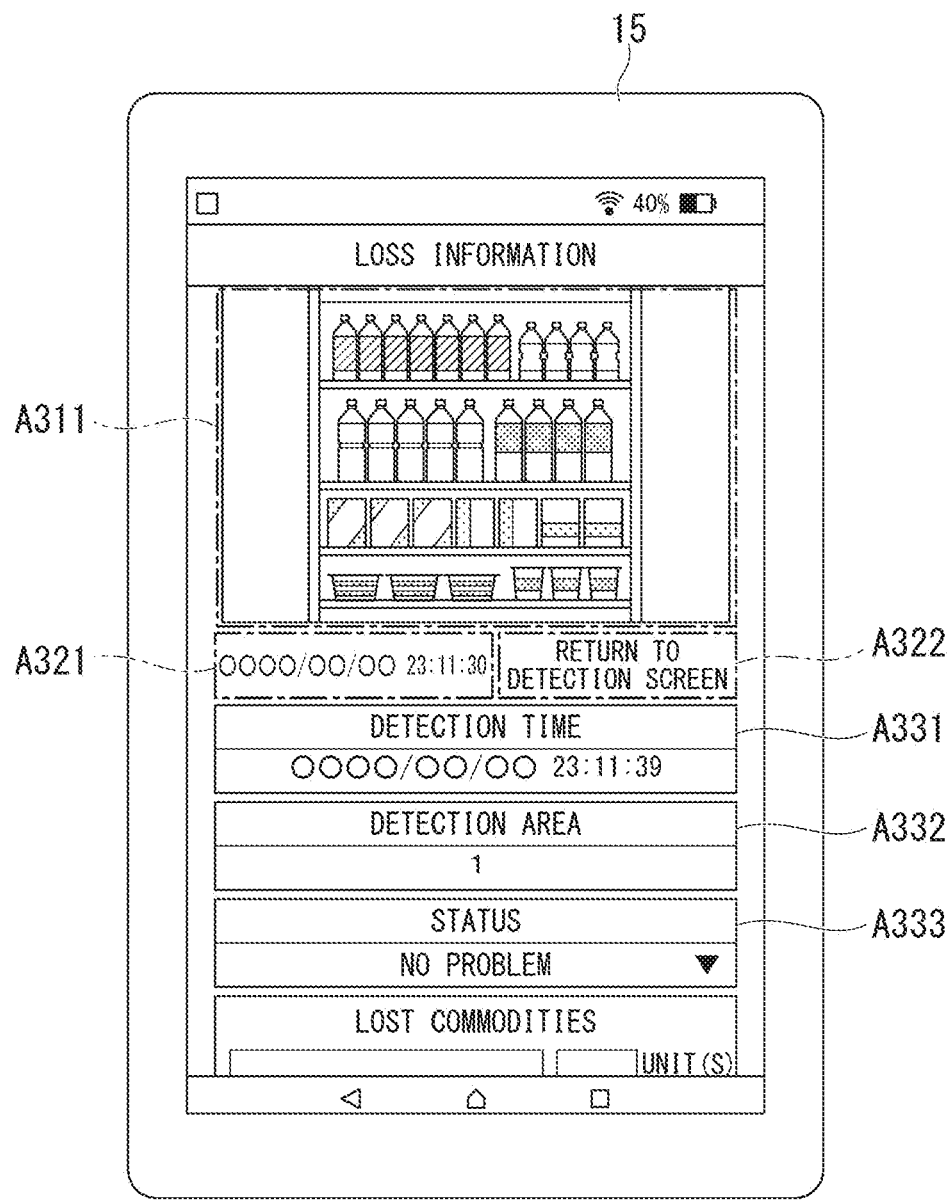
FIG. 7 is a drawing showing a first example of the details registration screen displayed by the second display unit according to the same embodiment.

FIG. 7 is a drawing showing a first example of the details registration screen displayed by the second display unit 230.

In the example of FIG. 7, areas A311, A321, and A322 are the same as the areas A211, A221, and A222 of FIG. 6, respectively. Areas A331 and A332 are the same as the areas A241 and A242 of FIG. 6, respectively.

In the details registration screen of FIG. 7, the second display unit 230 displays status information in the area A333. This status information is information indicating a determination result in which a store clerk who is the user of the terminal device 15 determines the presence or absence of a problem with regard to a removal. The value of the status information is set to "Problem" by a touch operation on the area A231 in FIG. 6. Alternatively, the value of the status information is set to "No problem" by a touch operation on the area A232 in FIG. 6. In the area A333, the user can change the value of the status information. Specifically, when a touch operation is performed on the button with a black down-pointing triangle in the area A333, the second display unit 230 displays a drop-down menu indicating "Problem" and "No problem". When a touch operation to either "Problem" or "No problem" is performed in the drop-down menu, the loss information processing unit 292 updates the value of the status information to the value selected by the touch operation.

Figure 8:
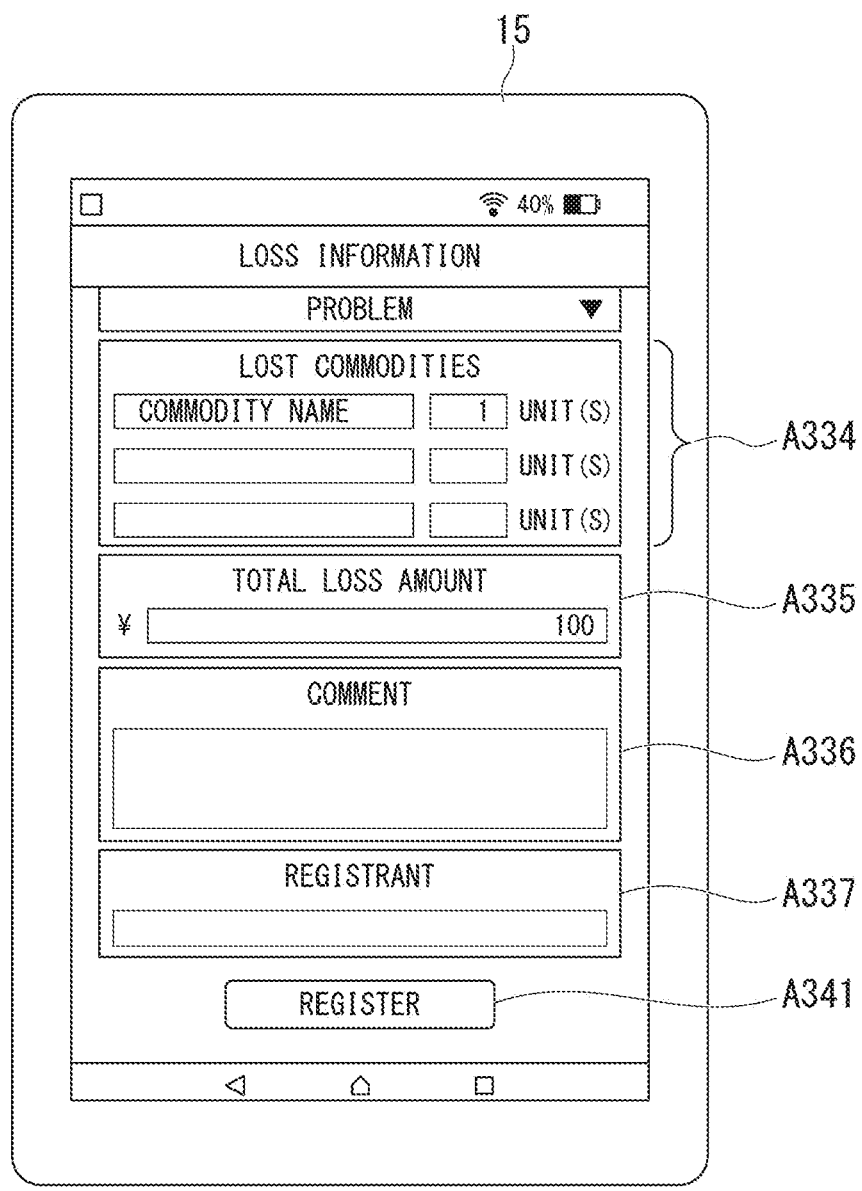
FIG. 8 is a drawing showing a second example of the details registration screen displayed by the second display unit according to the same embodiment.

FIG. 8 is a drawing showing a second example of the details registration screen displayed by the second display unit 230.

FIG. 8 shows an example of the details registration screen continued from the lower side of the details registration screen shown in FIG. 7. The second display unit 230 displays the screen of FIG. 8 according to the control of the loss information processing unit 292 by scrolling down the details registration screen of FIG. 7.

An area A334 is an input field in which information relating to lost commodities can be input. The second operation input unit 220 receives, by free word input, inputs of the commodity name and quantity of a stolen commodity (the commodity removed from the commodity shelf 910).

An area A335 is an input column for the total loss amount. The second operation input unit 220 receives, by free word input, an input of the total loss amount due to the removal in question (for example, the total amount of theft loss).

An area A336 is a comment input field. The second operation input unit 220 receives user comments by free word input.

An area A337 is a display field of the registrant. The second operation input unit 220 may receive an input operation of a registrant's name. Alternatively, the second operation input unit 220 may cause the loss information processing unit 292 to automatically display in the area A337 the name of the user who has logged in to the terminal device 15 during input of the loss information.

When a touch operation on an area A341 is performed, the loss information processing unit 292 transmits the loss information that has been input to the commodity monitoring device 13 via the second communication unit 210. In the commodity monitoring device 13, the first storage unit 180 stores the loss information in association with the change detection information. Further, the second display unit 230 ends the display of the details registration screen by a touch operation on the area A341, and displays, for example, a loss information list screen. The loss information list screen will be described referring to FIG. 9.

Figure 9:
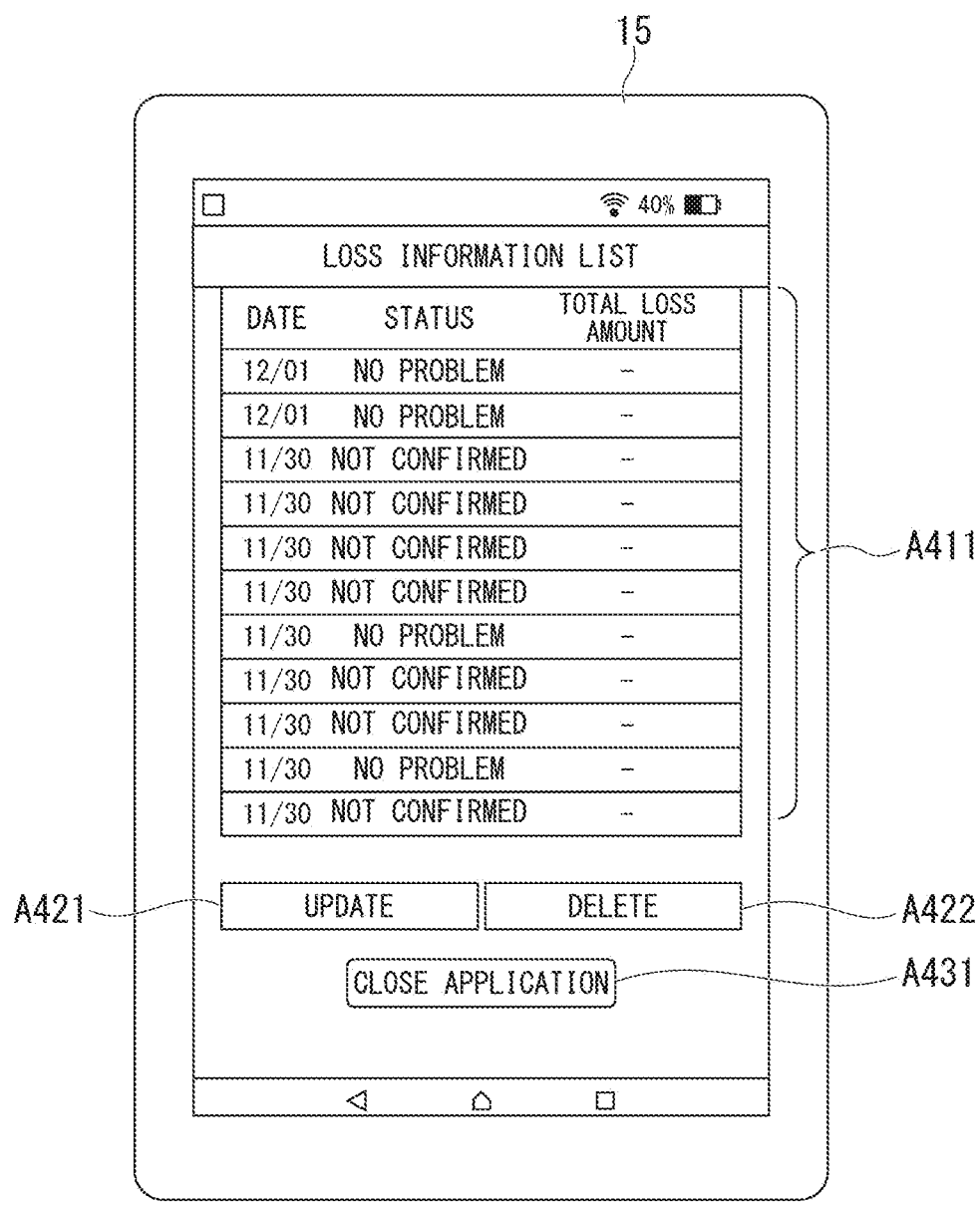
FIG. 9 is a drawing showing an example of the loss information list screen displayed by the second display unit according to the same embodiment.

FIG. 9 is a drawing showing an example of the loss information list screen displayed by the second display unit 230.

In the example of FIG. 9, the second display unit 230 displays a list of loss information items in an area A411.

An area A421 is a touch area for receiving an update of the loss information. When a touch operation is performed on the area A421 in a state where any one of the loss information items is selected by a touch operation to the list in the area A411, the loss information processing unit 292 acquires the selected loss information from the commodity monitoring device 13. The loss information processing unit 292 causes the second display unit 230 to display a details registration screen having the acquired loss information. The loss information processing unit 292 updates the loss information in accordance with the information updated according to the user operation.

An area A422 is a touch area that receives deletion of loss information. When a touch operation is performed on the area A422 in a state where any one of the loss information items is selected by a touch operation to the list in the area A411, the loss information processing unit 292 transmits to the commodity monitoring device 13 via the first communication unit 110 an instruction to delete the selected loss information item. The commodity monitoring device 13 deletes the loss information in accordance with the deletion instruction.

In order to prevent an unauthorized operation with respect to the loss information, only a store clerk who is authorized among the plurality of store clerks may update or delete loss information.

An area A431 is a touch area that receives an instruction to end a display regarding removal. When a touch operation on the area A431 is performed, the second display unit 230, according to the control of the second control unit 290, ends the display related to removal and displays the standby screen.

Figure 10:
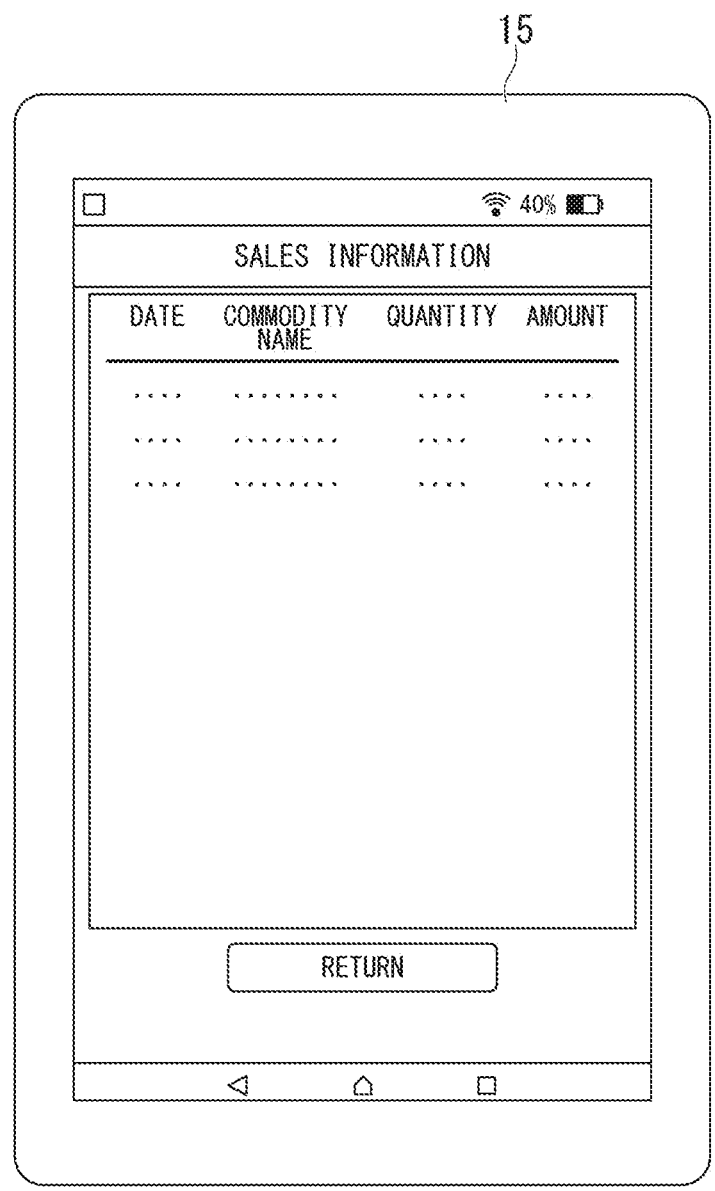
FIG. 10 is a drawing showing an example of the sales history screen displayed by the second display unit according to the same embodiment.

FIG. 10 is a drawing showing an example of the sales history screen displayed by the second display unit 230.

If there is sales information associated with a removal detected by the commodity state detection unit 191, the commodity monitoring device 13 acquires the sales information from the POS system 17, associates the change detection information with the sales information, and stores the sales information in the first storage unit 180. Here, various correspondence relationships can be adopted as the correspondence relationship between the removal and the sales information. For example, the commodity monitoring device 13 may determine sales information within a predetermined time after a removal occurs to be the sales information corresponding to the removal. Alternatively, the commodity monitoring device 13 may determine the sales information indicating a purchase of the commodity removed from the commodity shelf 910 among the sales information within a predetermined time after a removal occurs, to be the sales information corresponding to the removal.

In the event of a user operation that instructs display of the sales history screen (FIG. 10) being performed while the second display unit 230 is displaying the detection information screen (FIG. 6), the loss information processing unit 292 causes the second display unit 230 to display the sales information associated with the detection information screen. Specifically, the loss information processing unit 292 acquires, from the commodity monitoring device 13, sales information associated with the removal that is the subject of the detection information screen being displayed, and causes the second display unit 230 to display the sales information.

In the event of a user operation that instructs display of the sales history screen (FIG. 10) being performed while the second display unit 230 is displaying the details registration screen (FIG. 7, FIG. 8), the loss information processing unit 292 causes the second display unit 230 to display the sales information associated with details registration screen. Specifically, the loss information processing unit 292 acquires, from the commodity monitoring device 13, sales information associated with the removal that is the subject of the details registration screen being displayed, and causes the second display unit 230 to display the sales information.

When a user operation instructing the end of the display of the sales history screen is performed, the second display unit 230 ends the display of the sales history screen, and returns to display of the detection information screen (FIG. 6) or display of the details registration screen (FIG. 7, FIG. 8).

Figure 11:
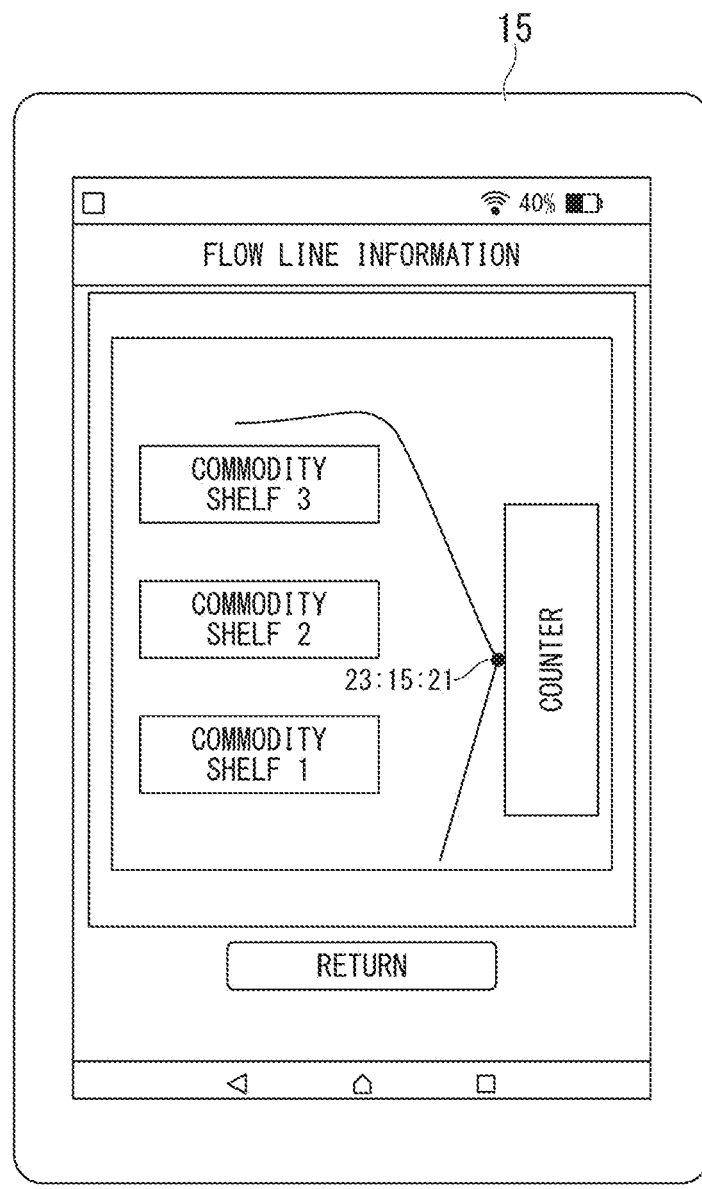
FIG. 11 is a drawing showing an example of a flow line screen displayed by the second display unit according to the same embodiment.

FIG. 11 is a drawing showing an example of a flow line screen displayed by the second display unit 230.

In the example of FIG. 11, the second display unit 230 displays, on a floor plan of the store, the flow line information of a customer who performed removal.

In the example of FIG. 11, the customer has stopped at the counter. The counter corresponds to an example of a predetermined checkout area. The second display unit 230 displays, in addition to the flow line information of the customer, the time at which the customer stopped at the counter.

The store clerk who is the user of the terminal device 15 causes the terminal device 15 to display sales information at the timing when the customer stops by the counter. Thereby it is possible to determine whether or not the removal is a valid removal. If the sales information at the timing when the customer stopped by the counter indicates that the commodity subject to removal has been purchased, it is possible to determine that the removal is a valid removal.

Alternatively, in place of or in addition to the flow line information, the second display unit 230 may display, with text or symbols, information indicating whether or not the customer who has performed removal settled payment at the counter. Text indicating whether or not payment has been made is, for example, "paid"/"not paid". Symbols indicating whether or not the payment is made are, for example, "○"/"X".

Next, the operation of the commodity monitoring system 10 will be described with reference to FIGS. 12 and 13.

Figure 12:
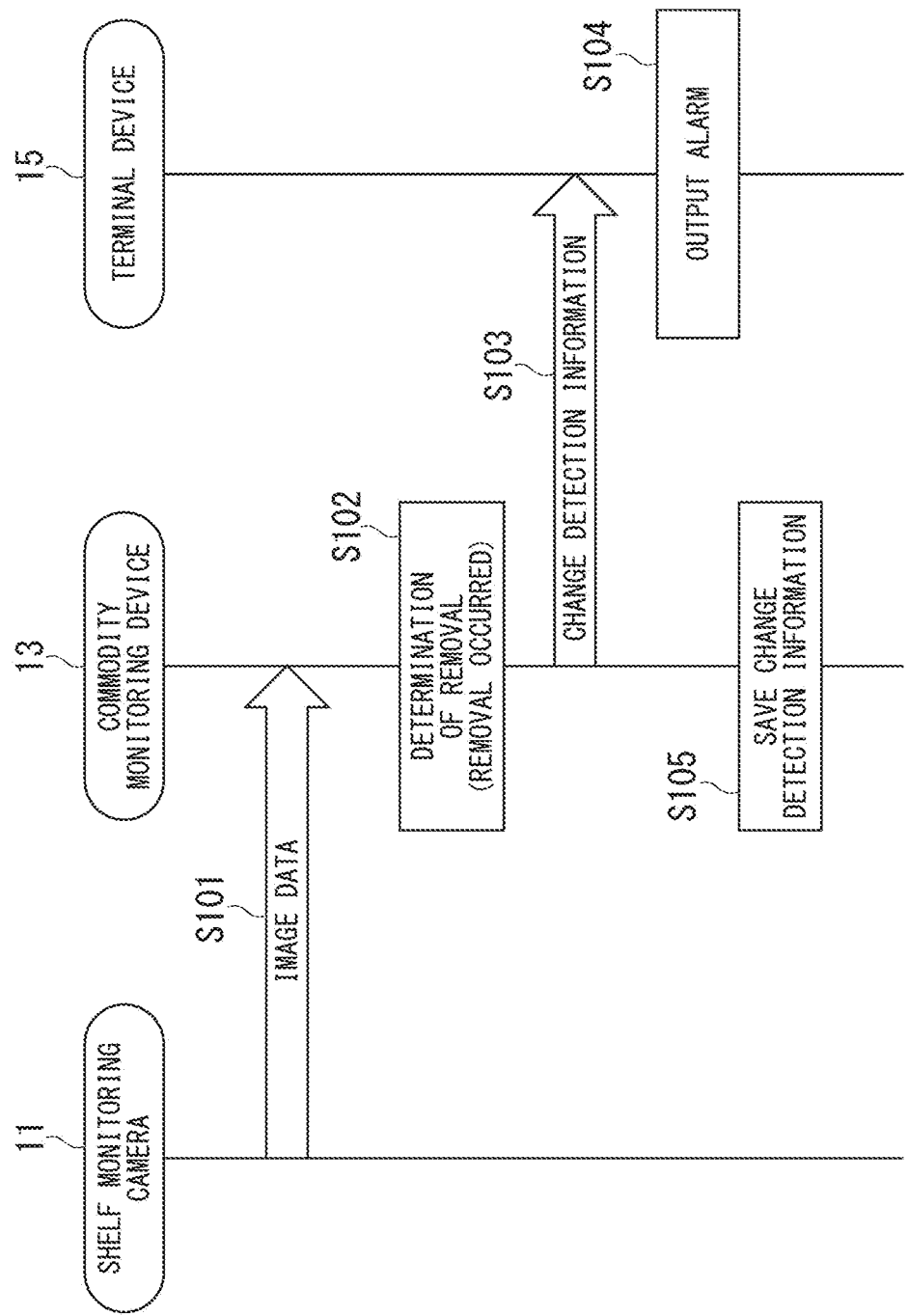
FIG. 12 is a diagram showing an example of operation of the commodity monitoring system in the case of detecting removal in the same embodiment.

FIG. 12 is a diagram showing an example of operation of the commodity monitoring system 10 in the case of detecting removal.

The shelf monitoring camera 11 transmits image data generated by capturing an image of the commodity shelf 910 to the commodity monitoring device 13 (sequence S101). The shelf monitoring camera 11 may continuously transmit moving image data of the commodity shelf 910 to the commodity monitoring device 13. Alternatively, the shelf monitoring camera 11 may collectively transmit moving image data of the commodity shelf 910 to the commodity monitoring device 13 in blocks of fixed time durations. Alternatively, the shelf monitoring camera 11 may transmit still image data corresponding to a frame of moving image data to the commodity monitoring device 13 instead of transmitting moving image data.

The commodity monitoring device 13 upon acquiring the image data of the commodity shelf 910 determines whether or not a removal has occurred on the basis of the obtained image data (sequence S102). Specifically, the commodity monitoring device 13 compares the newly acquired image of the commodity shelf 910 with a past image of the commodity shelf 910 and detects the difference between the images. The commodity monitoring device 13 determines, for any commodity group area, whether the proportion of a partial area corresponding to the detected difference to the area of the entire commodity group area is equal to or greater than a threshold value. If it is determined that the proportion is equal to or greater than the threshold value, the commodity monitoring device 13 determines that a removal has occurred. In the example of FIG. 12, the commodity monitoring device 13 determines that there has been a removal.

The commodity monitoring device 13 that has determined that a removal has occurred generates change detection information related to the detected removal and transmits the change detection information to the terminal device 15 (sequence S103).

The terminal device 15 outputs a removal alarm on the basis of the change detection information received from the commodity monitoring device 13 (sequence S104).

Further, the commodity monitoring device 13 saves (stores) the generated change detection information (sequence S105).

The commodity monitoring device 13 may generate change detection information including one or both of sales information and flow line information. Alternatively, after the commodity monitoring device 13 transmits the change detection information to the terminal device 15, the commodity monitoring device 13 may transmit one or both of the sales information and the flow line information to the terminal device 15.

Figure 13:
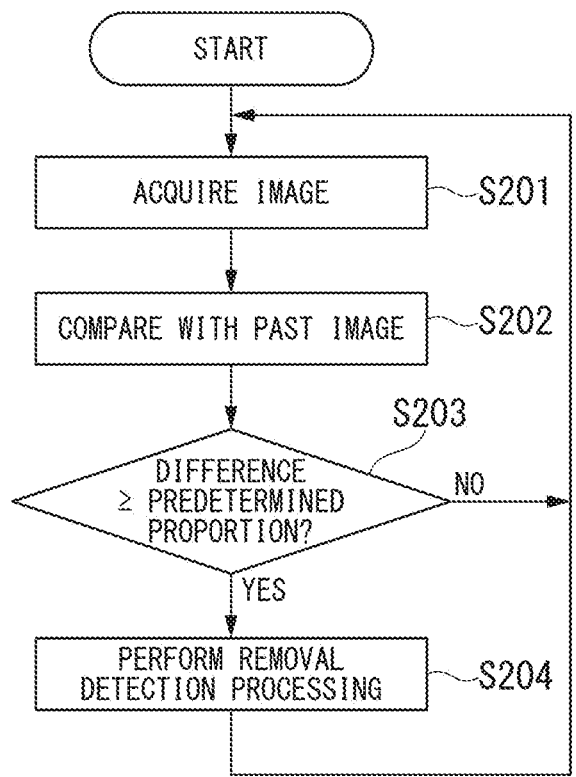
FIG. 13 is a flowchart showing an example of the processing procedure in which the commodity monitoring device determines the presence or absence of removal according to the same embodiment.

FIG. 13 is a flowchart showing an example of the processing procedure in which the commodity monitoring device 13 determines the presence or absence of removal.

In the process of FIG. 13, the commodity state detection unit 191 acquires image data of the commodity shelf 910 from the shelf monitoring camera 11 via the first communication unit 110 (Step S201). Then, the commodity state detection unit 191 compares the image data of the commodity shelf 910 obtained in Step S201 with past image data (for example, an image of 10 seconds before) of the commodity shelf 910 (Step S202). Then, for each of the commodity group areas, the commodity state detection unit 191 determines whether the proportion of the area of the difference portion (difference) of the image of the commodity group area to the area of the entire commodity group area is equal to or greater than the threshold value (Step S203).

If it is determined that the proportion is less than the threshold value for any of the commodity group areas (Step S203: NO), the process returns to Step S201. On the other hand, if it is determined that the proportion is greater than or equal to the threshold value for any of the commodity group areas (Step S203: YES), the commodity monitoring device 13 performs processing upon detection of removal (Step S204). For example, as described with reference to FIG. 12, the commodity monitoring device 13 generates change detection information and transmits the change detection information to the terminal device 15, or stores the generated change detection information.

After Step S204, the process returns to Step S201.

As described above, based on the image information of the commodity group area set on the commodity shelf 910, the commodity state detection unit 191 detects the removal of a commodity in a quantity satisfying the predetermined condition from the commodity group area.

When the commodity state detection unit 191 has detected removal, the change detection information output unit 192 outputs to the terminal device 15 change detection information including image time-series data of the commodity group area from a point in time at which the removal was detected to a predetermined past point in time.

A store clerk who is a user of the terminal device 15 can recognize the possibility of unauthorized removal by recognizing a removal based on the change detection information. For example, the clerk can recognize the removal by the terminal device 15 outputting a removal alarm on the basis of the change detection information.

In particular, the commodity monitoring system 10 can detect the possibility of unauthorized removal with a relatively simple configuration in which the shelf monitoring camera 11 captures images of the commodity shelf 910. In this regard, according to the commodity monitoring system 10, an event in which a commodity is expected to be brought out of a store improperly can be detected at relatively low cost.

The change detection information output unit 192 may acquire sales information after the point in time at which the commodity state detection unit 191 detects removal, and output the change detection information including the sales information to the terminal device 15.

Thereby, the store clerk who is the user of the terminal device 15 can determine whether or not the removal is a valid removal with reference to the change detection information.

After the change detection information output unit 192 outputs the change detection information to the terminal device 15, the change detection information output unit 192 may acquire sales information after the point in time at which the commodity state detection unit 191 detected the removal and output the sales information to the terminal device 15.

The user of the terminal device 15 can determine whether or not the removal is a valid removal by referring to the sales information. The change detection information output unit 192 outputs the change detection information to the terminal device 15 without waiting for the acquisition of the sales information. For this reason, the user of the terminal device 15 can quickly recognize and respond to removal of the commodity from the commodity shelf 910.

The change detection information output unit 192 may acquire sales information registered in the POS system 17 within a predetermined time from the point in time at which the commodity state detection unit 191 detected the removal. In this way, the change detection information output unit 192 limits the time range for acquiring the sales information. As a result, it is possible to limit the sales information to which a store clerk possessing the terminal device 15 refers. In this respect, the burden on the store clerk can be reduced.

If the change detection information output unit 192 cannot acquire the sales information related to the removed commodities from the POS system 17 within a predetermined time from the point in time at which the commodity state detection unit 191 detected the removal, the change detection information output unit 192 may output change detection information that does not include the sales information to the terminal device 15.

If sales information is not included in the change detection information, the store clerk who possesses the terminal device 15 can estimate that there is a high possibility that the corresponding commodities have been removed from the store without going through the POS system 17. That is, the clerk can surmise that there is a high possibility that the commodities have been stolen.

The change detection information output unit 192 may acquire information relating to the person who has performed the removal on the basis of a past image of the product group area referenced to a point in time at which the commodity state detection unit 191 detected removal, and output the information to the terminal device 15.

The user of the terminal device 15, when specifying the person who performed the removal, can improve the accuracy of the person specification by referring to the information relating to the person who performed the removal.

The change detection information output unit 192 detects information relating to the person who has performed the removal based on a past image of the commodity group area referenced to the point in time at which the product state detection unit 191 detected the removal. At this time, the change detection information output unit 192 may output information relating to the person who performed the removal to the terminal device 15 after outputting the change detection information to the terminal device 15.

The user of the terminal device 15, when specifying the person who performed the removal, can improve the specification accuracy by referring to the information relating to the person who performed the removal. Further, the change detection information output unit 192 outputs the change detection information to the terminal device 15 without waiting for acquisition of the information relating to the person who has performed the removal. Thereby, the user of the terminal device 15 can quickly recognize and respond to removal of commodities from the commodity shelf 910.

The change detection information output unit 192 may determine, on the basis of the information relating to the person who has performed a removal, whether the person has passed the commodities (the removed commodities) through a predetermined checkout area. If it is determined that the checkout area has not been passed, the change detection information output unit 192, after outputting the change detection information to the terminal device 15, may output information relating to the person who has performed the removal to the terminal device 15.

In this way, the change detection information output unit 192 determines whether the person who has performed removal has passed the removed commodities through the checkout area. Thereby, the user of the terminal device 15 can use the information as reference information when determining whether a removal is a valid removal.

The second display unit 230 of the terminal device 15 may display any image of the image time-series data included in the change detection information on the basis of a user operation.

The user of the terminal device 15 can ascertain the situation when a removal is performed by referring to the image displayed by the second display unit 230.

The first display unit 130 of the commodity monitoring device 13 may display a moving image of the commodity group area from the point in time at which the commodity state detection unit 191 detected a removal to a predetermined past point in time.

The user of the commodity monitoring device 13 can ascertain the situation when a removal is performed by referring to this moving image.

Next, the minimum configuration of the present embodiment will be described with reference to FIGS. 14 to 16.

Figure 14:
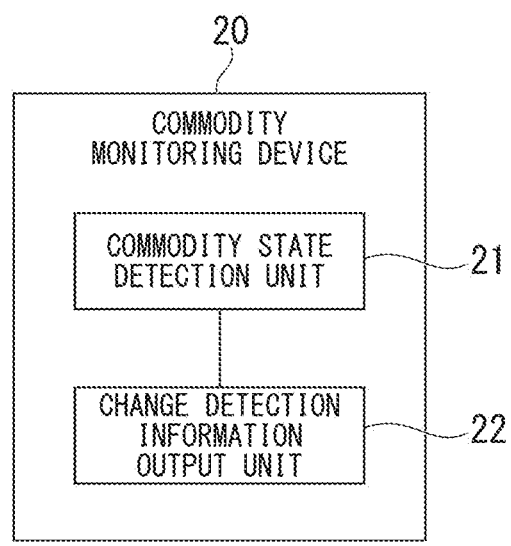
FIG. 14 is a drawing showing an example of the minimum configuration of the commodity monitoring device according to the present embodiment.

FIG. 14 is a drawing showing an example of the minimum configuration of the commodity monitoring device according to the present embodiment. A commodity monitoring device 20 shown in FIG. 14 is provided with a commodity state detection unit 21 and a change detection information output unit 22.

With such a configuration, the commodity state detection unit 21 detects the removal of a commodity in a quantity satisfying a predetermined condition from the commodity group area on the basis of image information of the commodity group area set on the commodity shelf. When the commodity state detection unit 21 has detected a removal, the change detection information output unit 22 outputs to an output destination device change detection information that includes image time-series data of the commodity group area from the point in time at which the commodity state detection unit 21 detected the removal to a predetermined past point in time.

The user can recognize the possibility of unauthorized removal by recognizing removals on the basis of the change detection information. In particular, the commodity monitoring device 20 can detect the possibility of unauthorized removal with a relatively simple configuration of capturing the image of the commodity shelf by a camera. In this regard, according to the commodity monitoring device 20, an event in which a commodity is expected to be brought out of a store improperly can be detected at relatively low cost.

Figure 15:
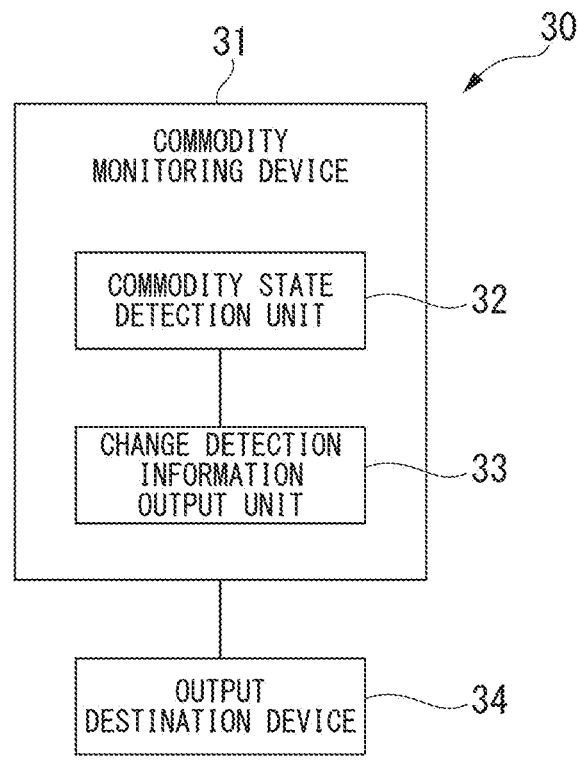
FIG. 15 is a drawing showing an example of the minimum configuration of the commodity monitoring system according to the present embodiment.

FIG. 15 is a drawing showing an example of the minimum configuration of a commodity monitoring system according to the present embodiment. A commodity monitoring system 30 shown in FIG. 15 is provided with a commodity monitoring device 31 and an output destination device 34. The commodity monitoring device 31 is provided with a commodity state detection unit 32 and a change detection information output unit 33.

With this configuration, the commodity state detection unit 32 detects the removal of a commodity in a quantity satisfying a predetermined condition from the commodity group area on the basis of image information of the commodity group area set on the commodity shelf. When the commodity state detection unit 32 has detected a removal, the change detection information output unit 33 outputs to the output destination device 34 change detection information that includes image time-series data of the commodity group area from the point in time at which the commodity state detection unit 32 detected the removal to a predetermined past point in time.

The user can recognize the possibility of unauthorized removal by recognizing removals on the basis of the change detection information. In particular, the commodity monitoring device 30 can detect the possibility of unauthorized removal with a relatively simple configuration of capturing the image of the commodity shelf by a camera. In this regard, according to the commodity monitoring device 30, an event in which a commodity is expected to be brought out of a store improperly can be detected at relatively low cost.

Figure 16:
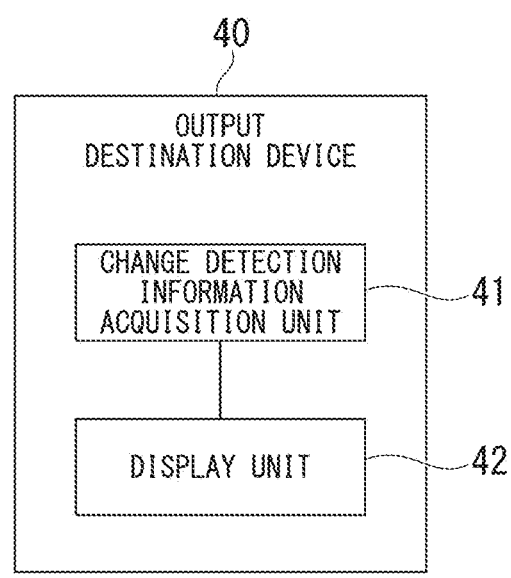
FIG. 16 is a drawing showing an example of the minimum configuration of the output destination device according to the present embodiment.

FIG. 16 is a drawing showing an example of the minimum configuration of an output destination device according to the present embodiment. The output destination device 40 illustrated in FIG. 16 is provided with a change detection information acquisition unit 41 and a display unit 42.

In this configuration, when the removal of a commodity in a quantity satisfying a predetermined condition from the commodity group area set on the commodity shelf has been detected, the change detection information acquisition unit 41 acquires change detection information that includes the image time-series data of the commodity group area from the point in time at which the removal was detected to a predetermined past point in time. The display unit 42 displays images of the commodity group area included in the change detection information.

The user can ascertain the situation in which the removal was performed by referring to images of the commodity group area.

A program for realizing all or a part of the functions of the first control unit 190 and the second control unit 290 may be recorded in a computer-readable recording medium, and the program recorded in the recording medium read and executed by a computer system to perform the processing of each unit. The "computer system" referred to herein includes an OS and hardware such as peripheral devices.

The "computer readable recording medium" is a portable medium such as a flexible disk, a magneto-optical disk, a ROM, and a CD-ROM, and a memory device such as a hard disk incorporated in the computer system. The abovementioned program may be a program for achieving a portion of the above-described functions. Moreover, the above-described program may be a program which can realize the above-described functions by being combined with a program which has already been recorded in the computer system.

Hereinabove, exemplary embodiments of the present invention have been described in detail with reference to the drawings. However, the specific configuration is not limited to the exemplary embodiments, and also includes design changes that do not depart from the scope of the present invention.

All or some of the above exemplary embodiments can be described as in the following supplementary notes, but the present invention is not limited to the following supplementary notes.

(Supplementary Note 1)

A commodity monitoring device provided with: a commodity state detection unit configured to, on the basis of image information of a commodity group area set on a commodity shelf, detect removal of a commodity in a quantity satisfying a predetermined condition from the commodity group area; and a change detection information output unit configured to, if the commodity state detection unit has detected the removal, output to an output destination device change detection information including image time-series data of the commodity group area from a point in time at which the commodity state detection unit detected the removal to a predetermined past point in time.

(Supplementary Note 2)

The commodity monitoring device according to supplementary note 1, wherein the change detection information output unit acquires sales information indicating sales history of the commodity at a point in time after the commodity state detection unit detected the removal, and outputs the change detection information including the sales information to the output destination device.

(Supplementary Note 3)

The commodity monitoring device according to supplementary note 1, wherein the change detection information output unit, after outputting the change detection information to the output destination device, acquires sales information indicating sales history of the commodity at a point in time after the commodity state detection unit detected the removal, and outputs the sales information to the output destination device.

(Supplementary Note 4)

The commodity monitoring device according to supplementary note 2 or supplementary note 3, wherein the change detection information output unit acquires sales information registered in a sales information management device within a predetermined time from a point in time at which the commodity state detection unit detected the removal.

(Supplementary Note 5)

The commodity monitoring device according to supplementary note 4, wherein when the change detection information output unit cannot acquire sales information relating to the commodity from the sales information management device within a predetermined time from a point in time at which the commodity state detection unit detected the removal, the change detection information output unit outputs the change detection information not including the sales information to the output destination.

(Supplementary Note 6)

The commodity monitoring device according to any one of supplementary notes 1 to 5, wherein the change detection information output unit, on the basis of a past image of the commodity group area referenced to a point in time at which the commodity state detection unit detected the removal, acquires information relating to a person who removed the commodity and outputs the information relating to the person who removed the commodity to the output destination device.

(Supplementary Note 7)

The commodity monitoring device according to any one of supplementary notes 1 to 5, wherein the change detection information output unit, on the basis of a past image of the commodity group area referenced to a point in time at which the commodity state detection unit detected the removal, detects information relating to a person who removed the commodity and, after outputting the change detection information to the output destination device, outputs the information relating to the person to the output destination device.

(Supplementary Note 8)

The commodity monitoring device according to supplementary note 7, wherein the change detection information output unit, on the basis of the information relating to the person who removed the commodity, determines whether the person passed the commodity through a predetermined checkout area and, in the case of having determined that the commodity was not passed through the checkout area, outputs the information relating to the person to the output destination device.

(Supplementary Note 9)

A commodity monitoring system comprising a commodity monitoring device and an output destination device, the commodity monitoring device being provided with: a commodity state detection unit configured to, on the basis of image information of a commodity group area set on a commodity shelf, detect removal of a commodity in a quantity satisfying a predetermined condition from the commodity group area; and a change detection information output unit configured to, if the commodity state detection unit has detected the removal, output to the output destination device change detection information including image time-series data of the commodity group area from a point in time at which the commodity state detection unit detected the removal to a predetermined past point in time.

(Supplementary Note 10)

The commodity monitoring system according to supplementary note 9, wherein the output destination device is provided with a display unit configured to display any image of the image time-series data included in the change detection information on the basis of a user operation.

(Supplementary Note 11)

The commodity monitoring system according to supplementary note 9 or supplementary note 10, further provided with a display device configured to display a moving image of the commodity group area from the point in time at which the commodity state detection unit detected the removal to a predetermined past point in time.

(Supplementary Note 12)

An output destination device provided with: a change detection information acquisition unit configured to, when removal of a commodity in a quantity satisfying a predetermined condition from a commodity group area set on a commodity shelf is detected, acquire change detection information including image time-series data of the commodity group area from a point in time at which the removal was detected to a predetermined past point in time; and a display unit configured to display the image of the commodity group area included in the change detection information.

(Supplementary Note 13)

A commodity monitoring method including the step of: when, based on image information of a commodity group area set on a commodity shelf, removal of a commodity in a quantity satisfying a predetermined condition from the commodity group area is detected, outputting to an output destination device change detection information including image time-series data of the commodity group area from a point in time at which the removal was detected to a predetermined past point in time.

(Supplementary Note 14)

A display method including the steps of: when removal of a commodity in a quantity satisfying a predetermined condition from a commodity group area set on a commodity shelf is detected, acquiring change detection information including image time-series data of the commodity group area from a point in time at which the removal was detected to a predetermined past point in time; and displaying the image of the commodity group area included in the change detection information.

(Supplementary Note 15)

A program for causing a computer to execute a processing of: when, based on image information of a commodity group area set on a commodity shelf, removal of a commodity in a quantity satisfying a predetermined condition from the commodity group area is detected, outputting to an output destination device change detection information including image time-series data of the commodity group area from a point in time at which the removal was detected to a predetermined past point in time.

(Supplementary Note 16)

A program for causing a computer to execute a processing of: when removal of a commodity in a quantity satisfying a predetermined condition from a commodity group area set on a commodity shelf is detected, acquiring change detection information including image time-series data of the commodity group area from a point in time at which the removal was detected to a predetermined past point in time; and displaying the image of the commodity group area included in the change detection information.

Priority is claimed on Japanese Patent Application No. 2017-042079, filed Mar. 6, 2017, the content of which is incorporated herein by reference.

INDUSTRIAL APPLICABILITY

According to the present invention, it is possible to detect at a comparatively low cost an event in which a commodity is expected to be brought out of a store improperly.

REFERENCE SIGNS LIST

10: Commodity monitoring system
11: Shelf monitoring camera
12: Hub
13: Commodity monitoring device
14: Wireless router device
15: Terminal device
16: In-store monitoring camera
17: POS system
110: First communication unit
120: First operation input unit
130: First display unit
180: First storage unit
190: First control unit
191: Commodity state detection unit
192: Change detection information output unit
210: Second communication unit
220: Second operation input unit
230: Second display unit
280: Second storage unit
290: Second control unit
291: Change detection information acquisition unit
292: Loss information processing unit

The invention claimed is:

1. A commodity monitoring device comprising:
at least one memory configured to store instructions; and
at least one processor configured to execute the instructions;
wherein the at least one memory is configured to store images of an immediate predetermined time duration of each of a plurality of commodity group areas set on a commodity shelf,
the at least one processor is configured to:
acquire, for the each of the plurality of commodity group areas, a first image of a commodity group area, and compare the first image with a second image of the commodity group area which is a past image of the immediate predetermined time duration stored in the at least one memory;
detect, for the each of the plurality of commodity group areas, removal of a commodity in a quantity from the commodity group area, if a proportion of an area corresponding to a difference between the first image and the second image of the commodity group area is equal to or greater than a threshold value that is different depending on a price of the commodity of the commodity group area; and
output, to an output destination device, change detection information including image time-series data of the commodity group area from a point in time at which the removal has been detected to a predetermined past point in time among images stored in the at least one memory, in the case where the removal has been detected.

2. The commodity monitoring device according to claim 1,
wherein the at least one processor is configured to acquire sales information indicating sales history of the commodity, after the removal has been detected, and output the change detection information including the sales information to the output destination device.

3. The commodity monitoring device according to claim 1,
wherein the at least one processor is configured to, after outputting the change detection information to the output destination device, acquire sales information indicating sales history of the commodity after the removal has been detected, and output the sales information to the output destination device.

4. The commodity monitoring device according to claim 2,
wherein the at least one processor is configured to acquire sales information registered in a sales information management device within a predetermined time after the removal has been detected.

5. The commodity monitoring device according to claim 4,
wherein the at least one processor is configured to, in the case where-sales information relating to the commodity is not acquired from the sales information management device within a predetermined time after the removal has been detected, output the change detection information not including the sales information to the output destination.

6. The commodity monitoring device according to claim 1,
wherein the at least one processor is configured to, based on a past image of the commodity group area before the removal has been detected, acquire information relating to a person who removed the commodity and output the information relating to the person who removed the commodity to the output destination device.

7. The commodity monitoring device according to claim 1,
wherein the at least one processor is configured to, based on a past image of the commodity group area before the removal has been detected, detect information relating to a person who removed the commodity and, after outputting the change detection information to the output destination device, output the information relating to the person to the output destination device.

8. The commodity monitoring device according to claim 7,
wherein the at least one processor is configured to, based on the information relating to the person who removed the commodity, determine whether the person passed the commodity through a predetermined checkout area and, in the case of having determined that the commodity was not passed through the checkout area, output the information relating to the person to the output destination device.

9. A commodity monitoring system comprising a commodity monitoring device and an output destination device, the commodity monitoring comprising:
at least one memory configured to store instructions; and
at least one processor configured to execute the instructions;
wherein the at least one memory is configured to store images of an immediate predetermined time duration of each of a plurality of commodity group areas set on a commodity shelf,
the at least one processor is configured to:
acquire, for the each of the plurality of commodity group areas, a first image of a commodity group area, and compare the first image with a second image of the commodity group area which is a past image of the immediate predetermined time duration stored in the at least one memory;
detect, for the each of the plurality of commodity group areas, removal of a commodity in a quantity from the commodity group area, if a proportion of an area corresponding to a difference between the first image and the second image of the commodity group area is equal to or greater than a threshold value that is different depending on a price of the commodity of the commodity group area; and
output, to the output destination device, change detection information including image time-series data of the commodity group area from a point in time at which the removal has been detected to a predetermined past point in time among images stored in the at least one memory, in the case where the removal has been detected.

10. The commodity monitoring system according to claim 9,
wherein the output destination device comprises a display unit configured to display any image of the image time-series data included in the change detection information based on a user operation.

11. The commodity monitoring system according to claim 9,
further comprising a display device configured to display a moving image of the commodity group area from the point in time at which the removal has been detected to a predetermined past point in time.

12. An output destination device comprising:
at least one memory configured to store instructions; and
at least one processor configured to execute the instructions to:
acquire, in the case where a proportion of an area corresponding to a difference between a first image of each of a plurality of commodity group areas set on a commodity shelf and a second image of a commodity group area which is a past image of an immediate predetermined time duration to the commodity group area is equal to or greater than a threshold value that is different depending on a price of a commodity of the commodity group area, and removal of the commodity in a quantity from the commodity group area set on the commodity shelf is detected, change detection information including image time-series data of the commodity group area from a point in time at which the removal has been detected to a predetermined past point in time; and
display the image of the commodity group area included in the change detection information.

13. The commodity monitoring device according to claim 3,
wherein the at least one processor is configured to acquire sales information registered in a sales information management device within a predetermined time after the removal has been detected.

14. The commodity monitoring device according to claim 13,
wherein the at least one processor is configured to, in the case where sales information relating to the commodity is not acquired from the sales information management device within a predetermined time after the removal has been detected, output the change detection information not including the sales information to the output destination.

15. The commodity monitoring device according to claim 2,
wherein the at least one processor is configured to, based on a past image of the commodity group area before the removal has been detected, detect information relating to a person who removed the commodity and, after outputting the change detection information to the output destination device, output the information relating to the person to the output destination device.

16. The commodity monitoring device according to claim 3,
wherein the at least one processor is configured to, based on a past image of the commodity group area before the removal has been detected, detect information relating to a person who removed the commodity and, after outputting the change detection information to the output destination device, output the information relating to the person to the output destination device.

17. The commodity monitoring device according to claim 4,
wherein the at least one processor is configured to, based on a past image of the commodity group area before the removal has been detected, detect information relating to a person who removed the commodity and, after outputting the change detection information to the output destination device, output the information relating to the person to the output destination device.

18. The commodity monitoring device according to claim 15,
wherein the at least one processor is configured to, based on the information relating to the person who removed the commodity, determine whether the person passed the commodity through a predetermined checkout area and, in the case of having determined that the commodity was not passed through the checkout area, output the information relating to the person to the output destination device.

19. The commodity monitoring device according to claim 16, wherein the at least one processor is configured to, based on the information relating to the person who removed the commodity, determine whether the person passed the commodity through a predetermined checkout area and, in the case of having determined that the commodity was not passed through the checkout area, output the information relating to the person to the output destination device.

20. The commodity monitoring device according to claim 17, wherein the at least one processor is configured to, based on the information relating to the person who removed the commodity, determine whether the person passed the commodity through a predetermined checkout area and, in the case of having determined that the commodity was not passed through the checkout area, output the information relating to the person to the output destination device.

* * * * *